United States Patent
Canjuga

(10) Patent No.: US 11,359,735 B2
(45) Date of Patent: Jun. 14, 2022

(54) AXIAL VALVE OF THE MODULAR CONCEPT OF CONSTRUCTION

(71) Applicant: HYDROMAT D.O.O., Ivanec (HR)

(72) Inventor: Slavko Canjuga, Ivanec (HR)

(73) Assignee: HYDROMAT D.O.O.

( * ) Notice: Subject to any disclaimer, the term of this patent is extended or adjusted under 35 U.S.C. 154(b) by 0 days.

(21) Appl. No.: 17/054,923

(22) PCT Filed: May 14, 2019

(86) PCT No.: PCT/HR2019/000012
§ 371 (c)(1),
(2) Date: Nov. 12, 2020

(87) PCT Pub. No.: WO2019/220153
PCT Pub. Date: Nov. 21, 2019

(65) Prior Publication Data
US 2021/0148477 A1 May 20, 2021

(30) Foreign Application Priority Data

May 14, 2018 (HR) .............................. P20180751A
May 14, 2019 (HR) .............................. P20190875A

(51) Int. Cl.
*F16K 15/18* (2006.01)
*F16K 27/02* (2006.01)
*F16K 37/00* (2006.01)

(52) U.S. Cl.
CPC ...... *F16K 15/1826* (2021.08); *F16K 27/0209* (2013.01); *F16K 37/0066* (2013.01); *Y10T 137/7762* (2015.04)

(58) Field of Classification Search
CPC ............. F16K 15/1826; F16K 27/0209; F16K 37/0066; Y10T 137/7762
See application file for complete search history.

(56) References Cited

U.S. PATENT DOCUMENTS

| | | | |
|---|---|---|---|
| 1,514,975 A | * | 11/1924 | Larner ................ G05D 7/0153 137/220 |
| 2,071,969 A | * | 2/1937 | Diescher ............... F16K 17/26 137/220 |

(Continued)

FOREIGN PATENT DOCUMENTS

| | | |
|---|---|---|
| EP | 0854992 | 5/2003 |
| EP | 1205697 | 11/2006 |

(Continued)

OTHER PUBLICATIONS

Patent Cooperation Treaty (PCT), International Search Report and Written Opinion for Application PCT/PCT/HR2019/000012 filed May 14, 2019. 25 Pages.

*Primary Examiner* — Jessica Cahill
(74) *Attorney, Agent, or Firm* — St Onge Steward Johnston and Reens LLC

(57) ABSTRACT

The present invention relates to an axial valve with a modular concept for the regulation of fluid flow and prevention of fluid reverse flow consisting of a single-piece and two-piece outer valve body (1; 99) that can be installed within the pipeline, the outer valve body (1; 99) of which contains a coaxially situated inlet and outlet fluid flow opening; a central valve body (2) which is connected to the outer valve body (1; 99) by means of a plurality of ribs (1.1), wherein a channels (7) are situated between the outer valve body (1; 99) and the central valve body (2), and said channels allow for an undisturbed flow of the flow fluid when said axial valve is open; an actuator (4*a*; 4-*b*; 4*c*; 4-SC; 4-SH; 4-SFMO) located axially within the central valve body (2; 100), the actuator of which contains an actuator piston (5-*a*; 5-*b*; 5-*c*; 90; 112; 106-SH) and an actuator piston rod (5.1-*a*; 5.1-*b*; 5.1-*c*; 86.1-*a*; 106.1-SH) to which a regulating piston (6-*a*; 80) is connected, and with an axial movement of which the flow of the fluid in a (Continued)

pipeline or a disc (104) for the prevention of fluid reverse flow is controlled. The axial valve further comprises a sealing system of the actuator piston rod (5.1-*a;* 5.1-*b;* 5.1-*c;* 86.1-*a;* 106-.1-SH) and a sealing control mechanism for the same; and a sensor mechanism for signalling a position of the regulating piston (6-*a;* 80) and the disc (104) of the check valve. The actuator, according to the present invention, may either be a hydraulic actuator (4*a;* 4-SH) or a mechanical actuator (4-*b*) or a pneumo-hydraulic actuator (4-*c*) or a pneumatic actuator (4-*c;* 4-SH; 4-SFMO), and the sensor mechanism may be either an internal sensor mechanism housed within any of the said actuators or an external sensor mechanism located outside of any of the said actuators, wherein any of the said actuators and said sensor mechanisms are modular and mutually complementary in such a way that they can be combined. The axial valve is a flow control valve or a check valve.

13 Claims, 34 Drawing Sheets

(56) References Cited

U.S. PATENT DOCUMENTS

| | | | |
|---|---|---|---|
| 2,124,619 A * | 7/1938 | Kerr | F16K 1/126 137/115.13 |
| 3,099,285 A * | 7/1963 | Berg | F16K 17/105 137/220 |
| 3,964,516 A | 6/1976 | Purton | |
| 4,167,262 A * | 9/1979 | Lemmon | F16K 31/363 137/487.5 |
| 4,398,563 A | 8/1983 | Kay | |
| 4,444,220 A | 4/1984 | Seger | |
| 4,567,915 A | 2/1986 | Bates | |
| 4,681,130 A | 7/1987 | Tabor | |
| 4,712,769 A | 12/1987 | Johnson | |
| 5,316,319 A | 5/1994 | Suggs | |
| 5,435,336 A | 7/1995 | Serot | |
| 5,448,962 A | 9/1995 | Moody | |
| 5,687,763 A | 11/1997 | Steinke | |
| 5,772,182 A | 6/1998 | Stambaugh, Sr. | |
| 5,826,613 A | 10/1998 | Schalk | |
| 5,964,248 A | 10/1999 | Enarson | |
| 6,029,691 A * | 2/2000 | Tavor | F16K 1/12 137/219 |
| 6,047,734 A | 4/2000 | Robinson | |
| 6,116,571 A * | 9/2000 | Hettinger | F16K 1/123 251/129.18 |
| 6,216,721 B1 * | 4/2001 | Perez | F16K 1/126 137/219 |
| 6,568,717 B1 | 5/2003 | Le Clinche | |
| 6,684,897 B2 | 2/2004 | Sundararajan | |
| 6,733,000 B2 | 5/2004 | McCarty | |
| 6,742,539 B2 * | 6/2004 | Lyons | F16K 1/126 137/219 |
| 6,755,354 B2 | 6/2004 | Fukano | |
| 6,817,406 B1 | 11/2004 | Inoue | |
| 6,874,761 B2 | 4/2005 | McCarty | |
| 6,923,428 B2 | 8/2005 | Quere | |
| 6,926,032 B2 | 8/2005 | Nawaz | |
| 6,929,245 B2 | 8/2005 | McCarty | |
| 7,066,447 B2 | 6/2006 | McCarty | |
| 7,178,785 B2 | 2/2007 | McCarty | |
| 8,312,893 B2 * | 11/2012 | Bey | F16K 1/126 137/625.38 |
| 8,931,504 B2 * | 1/2015 | Canjuga | F16K 1/126 137/220 |
| 10,222,812 B2 * | 3/2019 | Shu | F16K 17/048 |
| 2015/0267823 A1 * | 9/2015 | Avdjian | F16K 15/028 137/511 |

FOREIGN PATENT DOCUMENTS

| | | |
|---|---|---|
| EP | 2433037 | 3/2012 |
| GB | 532848 | 1/1941 |
| GB | 1552987 | 9/1979 |
| GB | 2536235 | 9/2016 |
| JP | 5659360 | 5/1981 |
| JP | 5673277 | 6/1981 |
| JP | 56113264 | 9/1981 |
| JP | 58109776 | 6/1983 |
| JP | 08226569 | 9/1996 |
| SB | 2198501 | 6/1988 |

* cited by examiner

FTC-HD  FTO-HD  DA-HD

FCV.MD

FTC-PHD

FTO-PHD

DA-PHD

AXIAL VALVE OF THE MODULAR CONCEPT OF CONSTRUCTION

DESCRIPTION OF THE INVENTION

Technical Field

The present invention deals with an axial valve of modular design, of a single-piece and two-piece valve body structure, with the possibility of installing an actuator to operate a regulating piston in the case of various types of control, shut-off and safety valves or a disc in the case of various types of check valves.

According to the present invention, actuators can be operated using an external energy source such as pressurized hydraulic oil, compressed air or some other inert gas, or directly fluid- or mechanically-operated. In order to create a valve feedback line to monitor a position of the regulating piston or the disc within a working stroke, the valve can be equipped with an appropriate sensor mechanism in two variants:

- Internal sensor mechanism, type INTS (Internal Sensoric, Internal Feedback System), located inside the actuator, or
- External sensor mechanism, type EXTS (External Sensoric, External Feedback System) located outside the actuator/valve.

The present invention belongs to the technical field of an axial valves in which the actuator and a regulating or shut-off element are coaxially placed in relation to a pipeline or a direction of flow so that the flow fluid is uni-directional and/or bi-directional.

Technical Problem

An axial piston flow control valves and an axial check valves are most commonly installed in a pipeline with the purpose of flow control or overpressure and/or underpressure protection, as well as with the purpose of protection of pumps, compressors and plant from hydraulic or back pressure surge. In order to accomplish these functions, in addition to a reliable actuator which allows for a movement of the regulating piston or the disk to the appropriate position, the present invention must also enable a reliable monitoring of the regulating piston position in all drive variants (i.e. position feedback) because this is of utmost importance for achieving precision, speed, repeatability, and reliability of regulation. Depending on the requirements and scope of application, the reliable function of the valve must be ensured across a wide range of environment temperatures and flow fluid temperatures, from cryogenic temperatures to hot steam temperatures. In addition, a valve structure should be such that cavitation damage is reduced to a minimum, that the structure minimizes noise and vibration, with a high resistance to pressure surges and sudden pressure changes.

STATE OF THE ART

Technical solutions in the state of the art are more or less limited to the protection of the specific valve structure with respect to the application area or of a single part of the valve, for example, the output element, or the operating principle of the actuator or valve.

In the state of the art there is no a regulating valve structure in terms of multifunctionality and modularity of a structural solution which would allow for the usage of different types of regulating piston drives in the same valve body, e.g. hydraulic or mechanical of, as well as for the modularity of various solutions of control of its position. Through the mentioned modularity, the present invention achieves great operational flexibility and multifunctionality in terms of reliable flow control, shut-off, check, or safety-relief functions. In addition, the present invention provides for a very wide range of applications such as: energy, water distribution and water management, water purifiers and desalinization plants, pump and compressor plants, protection of plants from water hammers, gas and petroleum, LNG plants, underwater and submersed installations, shipbuilding and offshore plants; etc.

In the state of the art of axial piston flow control valves in patent bases and literature, there are several interesting technical solutions which regulate the patent protection of the valve concept, output element, actuator principle or valve function. The reference solutions in the patent literature are: U.S. Pat. Nos. 3,964,516 A; 4,167,262 A; 4,398,563 A; 4,444,220 A; 4,567,915 A; 4,712,769 A; 5,316,319 A; 5,435,336 A; 5,448,962 A; 5,687,763 A; 5,772,182 A; 5,964,248 A; 6,047,734 A; 6,216,721 B1; 6,568,717 B1; 6,684,897 B2; 6,733,000 B2; 6,755,354 B2; 6,817,406 B2; 6,874,761 B2; 6,923,428 B2; 6,926,032 B2; 6,929,245 B2; 7,066,447 B2; 7,178,785 B2; 8,312,893 B2; DE 1172501; DE 3829726; FR 2130794; GB 2198501; GB 532848; EP 0854992 B1; EP 1205697 B1.

The world's leading manufacturers of axial flow control valves are listed below:

MOKVELD Axial Flow Control Valves; ERHARD Armaturen GmbH; GOODWIN International Ltd; RMG Regel+Messtechnik GmbH; VAG Armaturen GmbH; MAN-KENBERG GmbH and SGGT Valve Division, to which regulations, recommendations, and standards regulating the subject field: EN, DIN, ATEX, VDMA, IEC, ASME, ANSI, API, etc. must be added.

In the following text, short analyses with basic remarks have been provided for several of the aforementioned patent applications and solutions.

Patent No. EP2433037 relates to a hydraulic axial piston regulating valve with a linear position sensor, consisting of the valve body (1) and the central part (2), around which the fluid flows when the valve is opened, the hydraulic cylinder (3) with the piston (4) and the piston rod (5), to which the valve regulating piston (12) is firmly fastened. The linear position sensor (8) is placed inside the hydraulic cylinder, and in the electric version of the valve, the sensor with the magnetostrictive waveguide (20) is used. Compared to the present invention, the solution of EP2433037 has no possibility combining of different types of drives and different types of external sensor mechanisms within an axial valve in order to achieve different functions for different application areas and different flow fluids containing impurities or solid particles.

U.S. Pat. No. 8,312,893 B2 published on 20 Nov. 2012 (Roger Bey et al.) provides a technical solution with a built-in pneumatic actuator through which the movement of the regulating piston is achieved. To control the position of the regulating piston as in the present invention with a hydraulic drive, a linear position sensor is installed in the body of the valve, which, as an aside, tolerates a temperature of the working environment or flow fluid of −40 to +80° C. The disadvantage of the solution is the inability to easily apply other drive modes and other manners of controlling the regulating piston position, which essentially limits the use of the valve as compared to the valve of the present invention. For example, for the flow of higher temperature fluids, there is no possibility of mounting external position sensors for the device or additional end switches of the regulating piston position. Compared to the present invention, the solution has limited capability of an emergency drive, i.e., the cited solution has no possibility of an additional emergency hydraulic drive or mechanical drive via a spring.

Patent number GB 532848 (R. A. Blakebourgh and F. A. Klouman) published in 1939 gives instructions on the construction of a piston valve mounted into the flow of the flow fluid, in which flow is regulated by a piston which protrudes from the housing and whose diameter practically reduces the cross-section through which the fluid passes. The actuation of the piston is mechanical, by a gear transmission. Compared to the present invention, there is an important difference in the actuation of the valve piston. In the present invention, it is hydraulic. Also, the subject state of the art document does not indicate any possibility for indicating the exact position of the piston, which only makes the solution unsuitable for self-regulating purposes. Due to the said mechanics the regulation speed is low and there is no safety system (e.g. automatic closing/opening).

The technical solution described in the German patent application No. DE 3829726 (JEH Waldenmaier) of 1988 discloses the application of an axial piston flow control valve with a mechanical drive in the procedure of automatic flow or pressure control. The regulating feedback line is realized automatically by changing the flow fluid pressure upstream and downstream of the valve which, by means of an automatic control "pilot" valve operates an external mechanism that moves the regulating piston inside the valve in a purely mechanical way—by means of a crankshaft mechanism. The said system has limited application, especially in hard-to-reach areas and flow fluids containing impurities or solid particles. The drive system of the valve via a crankshaft mechanism has many disadvantages compared to the present invention, such as the non-linearity of movement of the regulating piston relative to the crankshaft rotation, the necessary functional clearance between the regulating piston and the guides cause vibration and noise. The limitation of the actuating force due to the need for large operating torques on the valve shaft limits the application, especially for larger valve operating pressures and safety functions.

A document published in 1986 by U.S. Pat. No. 4,681,130 (AR-KAL Plastic Products) talks about the construction of a piston valve that is mounted into the flow of the flow fluid, and whose flow regulation is regulated by a piston that elongates or shortens from the housing along which the fluid flows. The position regulation is done by hydraulic connecting piping and the entire valve corresponds to the dimension of the pipeline into which it is mounted. According to the inventor, this solution is particularly suitable in cases where hydraulic shocks occur in the system. It differs from the present invention in the design of hydraulic activation and the manner of "pulling out" of the regulating piston, as well as in the absence of a safety system. Furthermore, the technical solution shown does not have a built-in piston position sensor, so it is not suitable for application in the automatic flow rate regulation systems with feedback.

International Patent Application Number PCT/IL96/00109 (Tavor, Elhanan) from 1996, adopted and published as two EP patents Nos. EP0854992B1 and EP1205697B1, shows a design solution which is most similar to the one given by the present invention. The regulation of the position of piston pull-out from the section around which the fluid streaming is performed hydraulically by means of a spring mechanism which, in the event of pressure loss in the hydraulic section, acts on the piston with a force sufficient to close the valve—thereby solving the safety part of the problem. In this technical solution, unlike in the present invention, there is no reference to a possibility of installation of a piston position sensor to reliably indicate the state of the valve opening. This makes the said technical solution unsuitable for more demanding regulation or use in an automatic flow fluid regulation system with a feedback.

SUMMARY OF THE INVENTION

The present invention, with its axial valve body design, enables the use of modular actuators and modular ways of signalling a valve opening state by means of a modular sensor mechanisms, enabling their various combinations, as well as valve design and functions, from control, shut-off, safety-relief to check valves with an axial-type flow. Furthermore, the present invention providing technical solution of an actuator piston rod sealing system, sealing of a regulating piston and gaskets located at a rear outlet of the valve, said technical solution enables that said gaskets are exposed to a minimal wear.

An axial valve having a modular design for regulating a fluid flow and preventing a fluid reverse flow consisting of: a single-piece and two-piece outer valve body of dimensions making it suitable for installation within a pipeline, said valve body contains a coaxially located inlet and outlet for fluid flow; a central valve body which is connected to the outer valve body by means of a plurality of ribs, where between the outer valve body and the central valve body there are channels allowing an uninterrupted flow of flow fluid when said axial valve is open; an actuator housed axially within the central valve body, the actuator comprising an actuator piston and an actuator piston rod to which a regulating piston is connected, an axial movement of which controls the flow of fluid in the pipeline and a disc to prevent the fluid reverse flow; a sealing system of the actuator piston rod and a sealing control mechanism for it; a sensor mechanism for signalling a position of the regulating piston and a check valve disc; in that the said actuator is either a hydraulic actuator or a mechanical actuator or a pneumo-hydraulic actuator or a pneumatic actuator; the sensor mechanism is either an internal sensor mechanism housed within any of said actuators or an external sensor mechanism located outside any of said actuators, in that any of said actuators and said sensor mechanisms are modular and mutually complementary in such a way that they can be combined with each other. The single-piece and the two-piece outer body of the valve and the central body of the valve contain a bore extending radially through mentioned outer and central body, in that components of the external sensor mechanism pass through the bore or a connection is established between the internal sensor mechanism and a processor for an analysis of a signal of the regulating piston and check valve disk position.

BRIEF DESCRIPTION OF FIGURES

The invention will be described in detail with reference to the figures below as follows.

Figure 1:
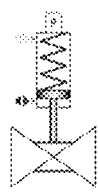
FIG. 1 schematically shows a design of an axial valve operated by an external energy source—pressurized fluid and the corresponding symbols and the actual state where the FTC symbol indicates the emergency closing action (fail to close), FTO—emergency opening action (fail to open) and DA—Double Acting with HD standing for hydraulic drive.
Figure 1:
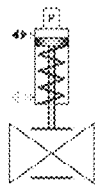
Figure 1:
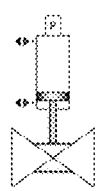
Figure 1:
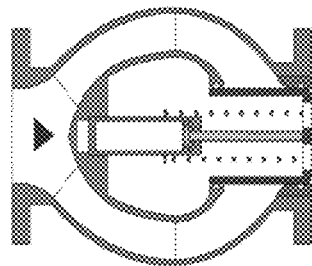
Figure 1:
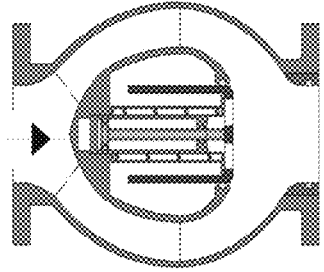
Figure 1:
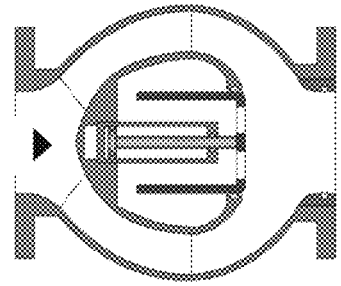

In order to facilitate the understanding of the present invention, below is an overview of the types of flow control valves and check valves in all variants of the drive and sensor mechanisms for the purpose of regulating the fluid flow and performing various safety functions which said valves must perform in a reliable, fast and repetitive manner without vibration and cavitation damage, which will also enable long service life.

The term "valve" as used in the present patent application and patent claims shall include an axial valve, an axial flow control valve and a check valve.

1. Flow Control Valves, Abbreviated FCV

Multiple types of external energy sources may be used to operate type actuators of flow control valves or a flow fluid energy can be used. For all types of drives and designs, an actuator is located in a central part of a regulating valve around which the flow fluid flows.

According to the present invention, depending on the type and source of an actuating fluid and an actuator drive mode, the FCV flow control valves can be divided as follows:

1.1 FCV.HD—Regulating valve in which the actuator is hydraulically driven, abbreviated "hydraulic drive" (HD HD) in two versions:

FCV.HD.EXT drive from external actuating fluid sources, which can be: pressurized hydraulic oil, compressed air or some other gas, abbreviated as "hydraulic drive external" (HD.EXT);

FCV.HD.INT flow fluid energy drive, shortened "hydraulic drive internal" (HD.INT); Valve Operated by Flow Medium Energy), most often operated via "pilot" valves automatically or are activated by remote control.

1.2 FCV.MD—Flow control valve where the actuator is mechanically driven, shortened "mechanical drive" (MD);

1.3 FCV.PHD—Flow control valve where the actuator for normal mode of operation is driven by compressed air or other type of gas, and the emergency drive uses pressurized hydraulic oil, shortened "pneumatic hydraulic drive" (PHD); and 1.4 FCV.PD—Flow control valve where the actuator for normal mode of operation is driven by compressed air or other type of gas, shortened "pneumatic drive" (PD).

1.1 Hydraulic drive of the regulating piston is realized by a modular design of the valve body and the actuator in such a way that an actuator of the same mounting dimensions can be placed in the same body of the flow control valve axially into its central part, regardless of whether it is a type of hydraulic HD or mechanical MD actuation of the regulating piston. All of the above-mentioned actuators can be fitted with different versions of sensor mechanisms for feedback regarding the movement of the regulating piston and can in essence be installed inside the actuator itself or the regulating piston movement is transferred to the sensors located outside the valve body. The emergency drive in case of hydraulic design for safety closing or opening of the valve is realized by means of a built-in spring or more often through an external hydraulic accumulator (emergency drive, safe fail to close or safe fail to open) as a source of mechanical energy for the reliable operation of the regulating piston of such valves.

Schematic FIG. 1 shows the design of the flow control valve with hydraulic drive of the actuator (FCV.HD.EXT) which is operated by an external energy source—pressurized fluid, which may be: pressurized hydraulic oil, compressed air or some other gas. This type of drive is used regardless of the contamination of the flow fluid, the operating pressures and nominal diameters, in a very wide area of application, from energy, water distribution, petroleum and oil, petrochemical plants to LNG.

Figure 2:
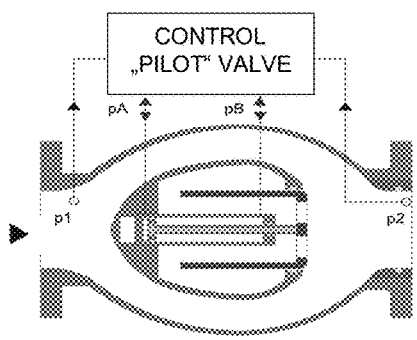
FIG. 2 schematically shows a design of an axial valves operated by a flow fluid in an automatic mode as well; independent and supervised.
Figure 2:
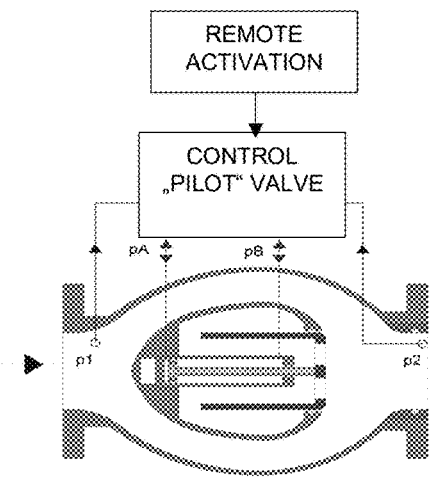

Schematic FIG. 2 illustrates the design of a flow control valve with hydraulic drive of the actuator (FCV.HD.INT), where the present invention uses the flow fluid energy, consisting of a basic flow control valve and associated actuator with a control "pilot" valve, which can operate fully automatically and be pre-set to perform certain functions, or can be activated remotely by "remote activation", for example, via a solenoid valve. This mode of operation and control of flow control valves is used to protect pumps or compressors from back pressure surge, safety-relief functions, reduce and maintain pressure and maintain flow. Limitations in terms of application include flow of contaminated fluids, nominal valve sizes and realization of more complex flow control functions.

Figure 3:
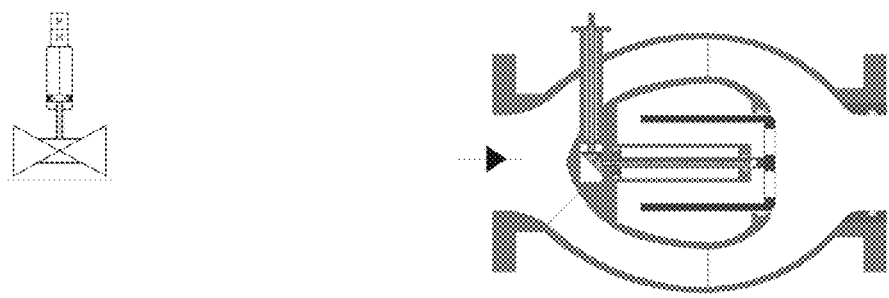
FIG. 3 schematically shows a design of an axial valve utilizing a mechanical drive (MD) and a corresponding symbol.

1.2 The mechanical drive of the regulating piston schematically illustrated in FIG. 3 is realized by means of a mechanical actuator consisting of a screw spindle, a nut, a corresponding bearing, a set of conical gears and a vertical drive sprocket to which a corresponding rotary drive is connected, which can be via an electric motor, hydraulic motor or pneumatic motor. They are realized as a modular design so that an actuator of the same mounting dimensions can be placed in the same body of the flow control valve in its central part, regardless of whether it is any type of hydraulic or mechanical drive of the regulating piston. The emergency drive for safety closing or opening of the valve in the mechanical design is most commonly realized by means of a manual wheel.

Figure 4:
FIG. 4 schematically shows a design of an axial valve operated by an external energy source—pressurized fluid and the corresponding symbols and the actual state where the FTC symbol indicates the emergency closing action (fail to close), FTO—emergency opening action (fail to open) and DA—Double Acting with PHD standing for pneumo-hydraulic drive.
Figure 4:
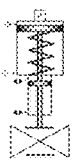
Figure 4:
Figure 4:
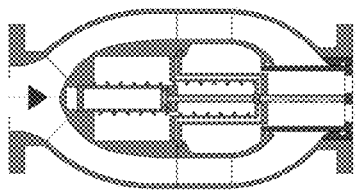
Figure 4:
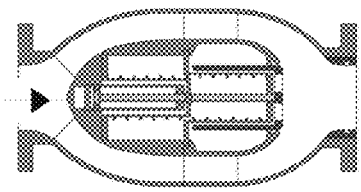
Figure 4:
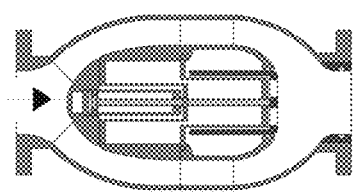
Figure 5:
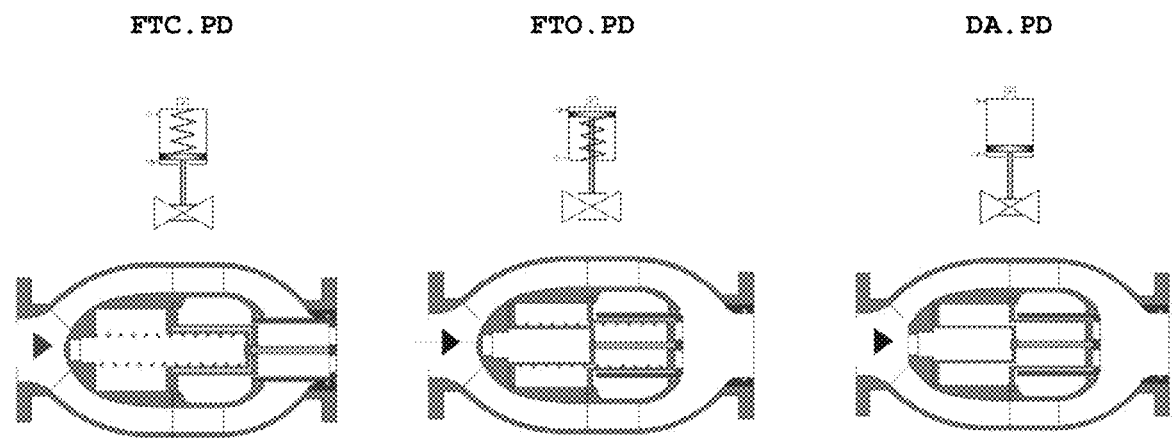
FIG. 5 schematically shows a design of an axial valve operated by an external energy source—pressurized fluid and the corresponding symbols and the actual state where the FTC symbol indicates the emergency closing action (fail to close), FTO—emergency opening action (fail to open) and DA—Double Acting with PD standing for pneumatic drive.

1.3 The pneumo-hydraulic drive FCV.PHD and 1.4 purely pneumatic FCV.PD drive of the regulating piston (schematic FIGS. 4 and 5) are realized by a modular design in such a manner that an actuator of the same mounting dimensions can be placed in the same body of the flow control valve into its central part, regardless of whether it is pneumo-hydraulic (PHD) or purely pneumatic (PD) drive of the regulating piston.

This valve design for the drive of the actuator or regulating piston for the realization of various control and/or safety functions can use different actuating fluids, whether from external sources (compressed air, inert gases, etc.) or flow fluid is used directly from the pipeline (gas, water, etc.).

Drive by compressed air or other gas is used without limitations for all types of flow fluids, regardless of their temperature and degree of contamination. The pneumatic part of the actuator is made of a solid piston or an elastic rubber membrane and compressed air is used for normal mode of operation, and the hydraulic part of the actuator is used to achieve a reliable emergency drive (i.e. emergency drive, safe fail to close or safe fail to open) i.e. for safety closing or opening of the valve it most often uses a hydraulic manual pump. In addition, this type of drive for safety closing or opening may use a built-in spring or the contents of a spare storage tank with compressed air.

1.4 The purely pneumatic drive of the regulating piston (FIG. 5) is realized by means of a special pneumatic actuator located in the central valve body. This type of actuator, i.e. movement of the regulating piston, does not have a special addition to achieve the hydraulic emergency drive of the actuators, but the safety closing or opening can be achieved by installing the appropriate springs or a spare storage tank with compressed air.

2. Check Valves, Abbreviated CV

Figure 6:
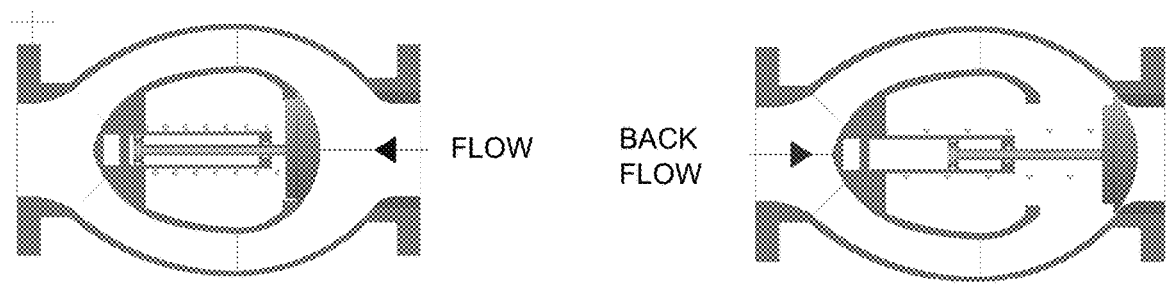
FIG. 6 schematically shows a design of a check valve coupled in the function of reverse flow protection, i.e. reverse water surge.

The basic function of each check valve shown schematically in FIG. 6 is protection from a reverse flow or "water hammer", so these valves in reality perform a very important safety function. For all types of drives and designs, an actuator is positioned axially in a center of a check valve body around which the flow fluid flows. In all types of check valves there is a basic problem that can be briefly described in the following manner. For the reliable function of the check valves, it is necessary to fit a spring which is as strong as possible, the task of which is to reliably return a valve disc to the closed position in the event of a pump failure.

However, as the spring is stronger, there are also higher flow losses because the dynamic pressure, especially at low flow speeds, cannot fully open the valve so that the constant flow from a pump has lesser or greater losses, depending on how much the valve is open. On the other hand, if we place a weaker spring, the check valve will open completely, but we have a weaker and unreliable reaction of the valve in the closing direction.

The basic characteristic of the present invention is that in all types of drives and designs of the axial check valves, the actuator is located in the central part of the valve body around which the flow fluid flows. The actuator design of managing and controlling the disc is of the same type and dimensions as with the control valves. Owing to this the changes required for the realization of check valves are reduced to a minimum, and the same valve bodies as with flow control valves are used, which significantly contributes to the quality and reduction of production costs and provides for a great variety of technical characteristics of check valves.

In addition, within the said actuators it is possible to install various types of sensor mechanisms, described in detail below, which provides for a simple and reliable signalling of the position of the disc, i.e. the opened state of the valve.

The solutions described below are used for the present invention.

2.1. Conventional Check Valves CV.SC (Check Valve with Spring Closing)

The operation of a check valve of this type (FIG. 37) is completely autonomous and is based solely on the flow fluid energy: water, petroleum, gas, compressed air, cryogenic and high-temperature fluids. Opening is performed automatically when starting the pump by dynamic pressure of the flow fluid acting on the check valve disc, and closing is performed automatically with the initial spring action and return flow in the event of a pump failure. Suitable throttle check valves can be fitted that can affect the opening or closing speeds. Since the opening of the valve is performed solely by the action of the dynamic pressure on the disc, weaker springs are installed in this type of valve to fully open the valve, especially in case of low flow rates.

2.2. CV.SC.HC—Check Valve Spring Closing with Hydraulic Control or CV.AC.HC—Check Valve Accumulator Closing with Hydraulic Control With this type of valve, the function is completely the same as with the previous one, only this type of valve has hydraulic oil or some other fluid in the actuator. This ensures reliable functioning of the check valve and adjusts the opening and closing times, regardless of the degree of contamination of the flow fluid or the presence of rigid particles. Dynamic pressure of the flow fluid acts on the valve disc in the direction of opening when the pump starts. The direction of closing is performed by the combined action of reverse flow of the flow fluid and spring or hydraulic accumulator for larger check valves. The solution consists of tanks with hydraulic oil and hydraulic throttle check valves which serve to adjust the opening and/or closing speeds as well as to eliminate the impact of the disc hitting the seating ring when closing.

2.3. Advanced Versions of Check Valves—CV.SC.FMFO (Check Valve with Spring Closing and Flow Medium Fully Open), CV.AC.FMFO (Check Valve with Accumulator Closing and Flow Medium Fully Open), and CV. EXPO (Check Valve with External Pressure Operating)

Figure 7:
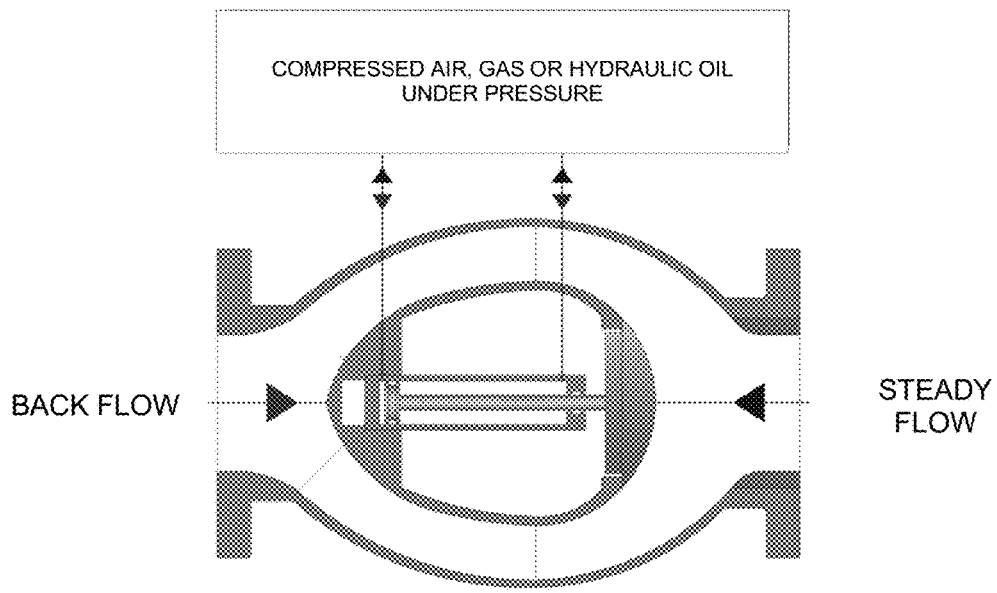
FIG. 7 schematically shows a design of a check valve with an external hydraulic or pneumatic operation of the valve.
Figure 8:
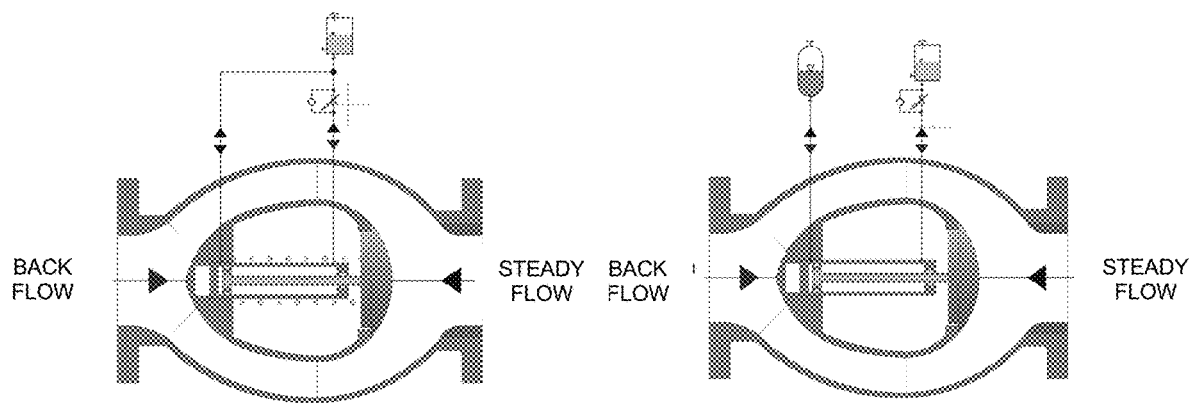
FIG. 8 schematically shows a design of a check valve with an internal hydraulic operation of the valve.
Figure 9:
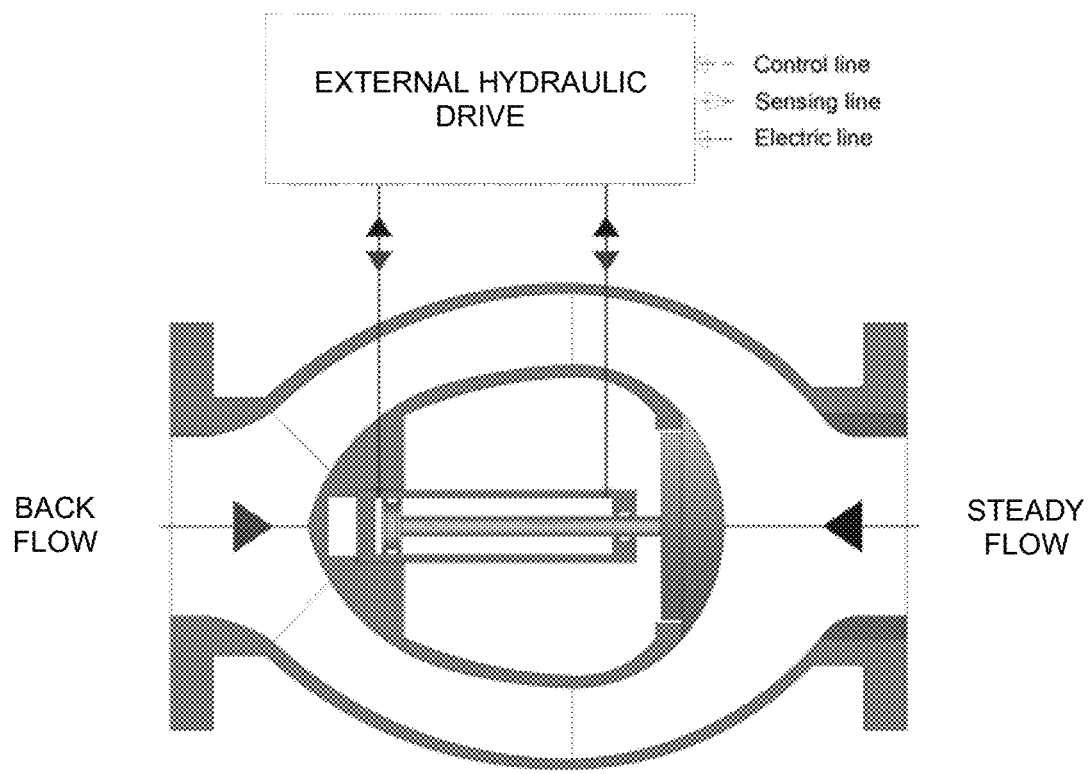
FIG. 9 schematically shows a design of a check valve with an external hydraulic operation of the valve.
Figure 10:
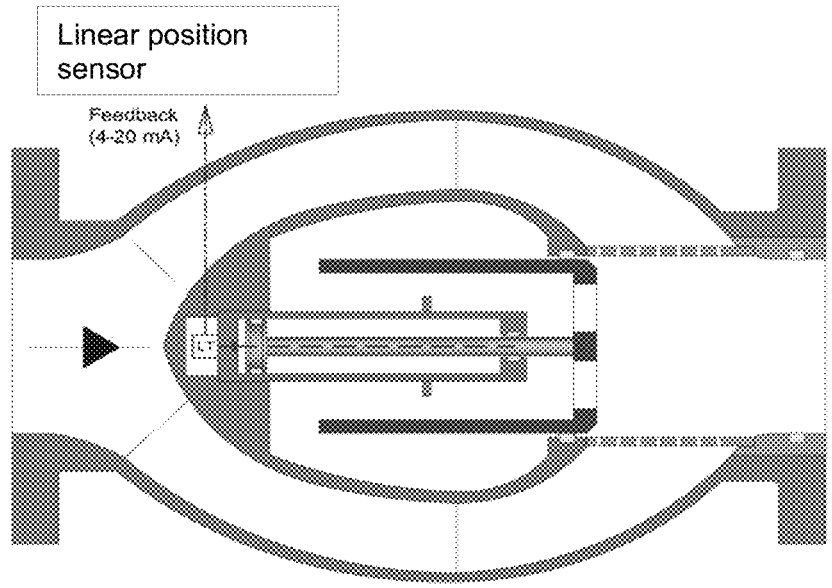
FIG. 10 schematically shows a design of an axial flow control valve with an internal sensor mechanism with feedback for a correct position of a regulating piston.
Figure 11:
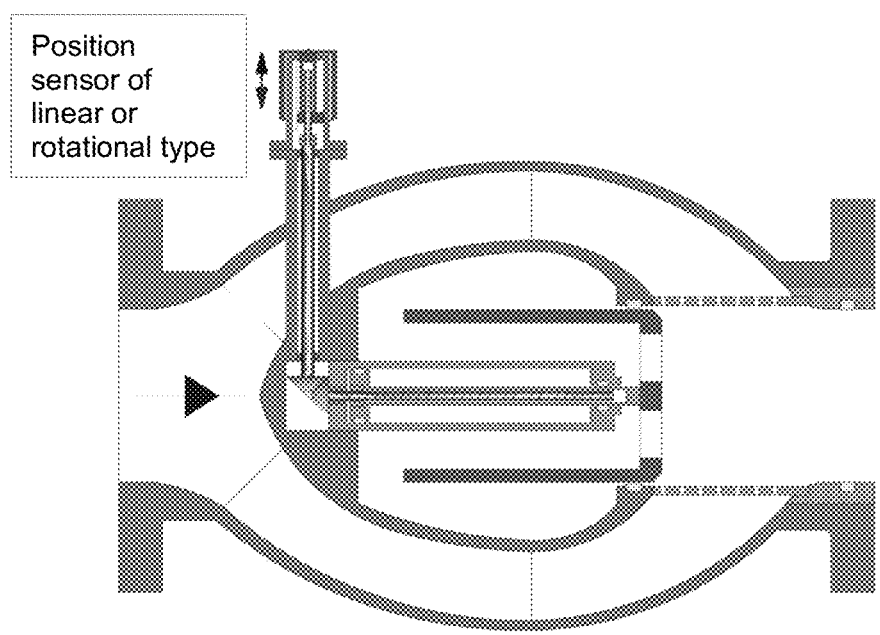
FIG. 11 schematically shows a design of an axial flow control valve with an external sensor mechanism with feedback for a correct position of a regulating piston.

In the case of advanced solutions for check valves, dynamic pressure of the flow fluid acts during the opening on the disc of the check valve, plus the static pressure component acting on the differential "B" side of the actuator piston (FIG. 7), so that their joint action completely opens the valve, even with very strong springs but at very low flow rates. This means that advanced check valve solutions completely eliminate the flow losses or financial losses that arise as a result of the spring or hydraulic accumulator operation from the previous item. In addition, they provide a much better and more reliable check valve protection function because a much stronger spring can be installed, type CV.SC.FMFO, or CV.AC.FMFO in the design with a hydraulic accumulator, where the hydraulic oil pressure acts on the actuator instead of the spring. In addition, in the case of using check valves with contaminated flow fluids and obtaining a flexible characteristic of check valves, type CV.EXPO, into an actuator on the piston "A" side and differential "B" side, drive fluid from external sources can be brought in, e.g. compressed air or gas or pressurized hydraulic oil (FIG. 9).

3. Sensor Mechanisms and Realization of a Feedback Regulation Link

According to the present invention, a signalling of a position of a regulating piston or a disc for check valves within a regulating stroke is performed by installing a sensor inside the valve itself, i.e. an internal sensor mechanism located in the actuator itself (Internal Sensoric) or the regulating piston movement is transmitted by means of an appropriate mechanism to the sensors installed outside the valve, i.e. EXTS (External Sensoric).

3.1. The internal sensor mechanism, type INTS, is developed in a form of a linear position sensor of a regulating piston, which basically consists of two parts, an electronic head with a corresponding magnet and a rod-shaped probe positioned centrally in a hydraulic actuator. There are many types of electronic linear position sensors, and a magnetostrictive linear position sensors are most commonly used. The principle of using the linear position sensor in the state of the art is known under the term of magnetostriction. Simply put, the process of measuring the position of the regulating piston is initiated by short electric impulses in the position sensor head generating electromagnetic waves transmitted via an ultrasonic probe longitudinally until they reach the reference position, which is most often a permanent magnet.

The difference between the transmission and reception times, i.e. readings of the wave disturbance indirectly measures the distance or position of the regulating piston. Such linear position sensors of the regulating piston are extremely reliable components. The time response, i.e. distance can be converted into a linear electrical value in the position sensor head itself and as an easily measurable electrical signal value (e.g., voltage or modulated current signal) can lead to the processor for analysing the subject signal.

3.2. External sensor mechanism, type EXTS

By using an external sensor mechanism, type EXTS, in the present invention, the movement of a regulating piston to sensors located on an outside of the valve is realized by a special mechanism, which may be the following.

3.2.1 EXTS.FS (External Sensorics with Fix Spindle), a sensor screw spindle in this design is fixed in a bevel gear spindle located at the bottom of the actuator and a nut. In a hydraulic actuator piston, there is the nut attached, whose axial movement is transmitted to a rotational movement of the sensor screw spindle, which is connected by bolts to the shaft with a bevel gear which transfers the rotation to a vertical sensor shaft.

The rotation of the vertical bevel gear spindle is transmitted through the sensor screw spindle to the translation of the nut which contains indexes for the activation of a final position micro-switches of the regulating piston, i.e., are used for further signalling of the open or closed position of the valve. In addition, a linear or rotary position sensor can be mounted on a sensor holder for continuous monitoring of the position of the regulating piston. This design of the sensor mechanism is mainly used for valves with a higher working stroke of the regulating piston, i.e. for larger nominal valve diameters, and the sensor spindle is in contact with the actuating fluid.

3.2.2. EXTS.MS (External Sensorics with Moving Spindle) A sensor screw spindle in this design is fixed in an actuator piston rod to which a regulating piston is attached. A hydraulic actuator piston is fastened to a screw spindle that transfers the axial motion of the piston into the rotational motion via the nut located in the shaft. Via the shaft and bevel gear, the rotation is transmitted to the vertical sensor shaft. The screw spindle is insulated from the hydraulic control pressure by an insulating piston rod that is fixed at the bottom of the actuator. The rotation of the vertical sensor shaft is transmitted through the screw spindle to the translation of the nut which has indexes on it which serve to activate the micro-switch of the final positions of the regulating piston. In addition, a linear or rotary position sensor can be mounted on the sensor holder for continuous monitoring of the position of the regulating piston. This type of sensor mechanism is used for valves with a lower working stroke, therefore for smaller nominal valve sizes, and the sensor spindle is out of reach of the actuating fluid.

3.2.3. EXTS.SC (External Sensoric with Steel Cable) This type of a sensory mechanism consists of a steel wire rope and a suitable tackle and a sensor mount attached to the body on the outside of the valve. One end of the steel wire rope is secured to the piston rod and the other in a special gasket located in the sensor mount on the outside of the valve. The required angle turning of the steel wire rope is carried out by means of a special tackle fastened at the bottom of the actuator. To achieve movement of the actuating element of the sensor, there is a spring in both directions that always holds the steel wire rope with the required tensile force. The steel wire rope is secured from the actuating fluid via a special insulating piston rod secured to flange of the actuator bottom. Different types of linear position sensors and end position micro-switches can be fixed to the sensor mount to signal the position of the regulating piston. If the stroke of the sensor actuating element is too large for vertical mounting, by installing another steel wire rope tackle, the sensor mount can be rotated by 90°, i.e. placed in the horizontal longitudinal position, which results in design compactness.

Combinations of different types of drives and sensor mechanisms, in addition to high quality and reliable control and/or safety functions, provide for a wider range of different valve designs with different functions for different application areas and different flow fluids. In addition, the modularity of the solution enables significant shortening of the production deadlines and reduction of production costs. The actuator tightening after its positioning in the central part of the valve is performed by means of a clamping head of the central valve part and a special clamping bush, and for larger valves additionally by means of a clamping flange on the front of the actuator.

The present invention provides a sealing control or control from the penetration of an external flow fluid towards an interior of an actuator and vice versa from the actuator towards a fluid flow area. The presence of the flow fluid in a channel means that a piston rod seal is damaged and leaking. The presence of an actuating fluid, e.g. hydraulic oil or compressed air in the channel means that it is leaking because an inner piston rod gasket is damaged. The presence of flow or the actuating fluid can be detected visually by observation or remotely via a suitable pressure switch that registers an appropriate pressure increases in the channel and warns of a gasket damage.

In addition to the aforementioned features of controlling the gasket system, the piston rod guide is mounted in the actuator body and is secured from axial movement by a clamping cap with the appropriate screws. This results in high reliability of the actuator and flexibility in using various types of gaskets depending on the flow fluid, temperature and pressure.

Protection from regulating piston rotation depending on valve size is performed in a variety of design manners, but it is common to all that it is carried out by means of a parallel key placed and fastened by screws on the rim or inside the actuator. On its inner side, the regulating piston has an appropriate groove or a secured segment in which the parallel key slides and thus prevents unwanted rotation of the regulating piston. For larger nominal valve diameters, the segment is fixed on a specially made pipe attached with a clamp to the regulating piston. The aforementioned protection from regulating piston rotation is performed primarily in the event of the use of external sensor mechanisms EXTS, while the protection for internal sensors INTS is not required.

DETAILED DESCRIPTION OF THE INVENTION

1. Flow Control Valves, Abbreviated FCV

To operate the type actuators of flow control valves, multiple types of actuating energy from an external source or a flow fluid energy can be used. For all types of drives and designs, an actuator is positioned axially in a center of a check valve body around which the flow fluid flows.

The design of an axial valve makes it ideal for: pump start-up, quick filling and discharge of the tank and dam discharges, turbine operation; as a regulating, measuring, shut-off and safety element in pipelines and water supply networks; for the prevention of hydraulic shocks; as a flow control valve of test stations in the transport of natural gas and generally in flow regulation of various fluids.

1.1 Hydraulic Drive (HD)

Figure 12:
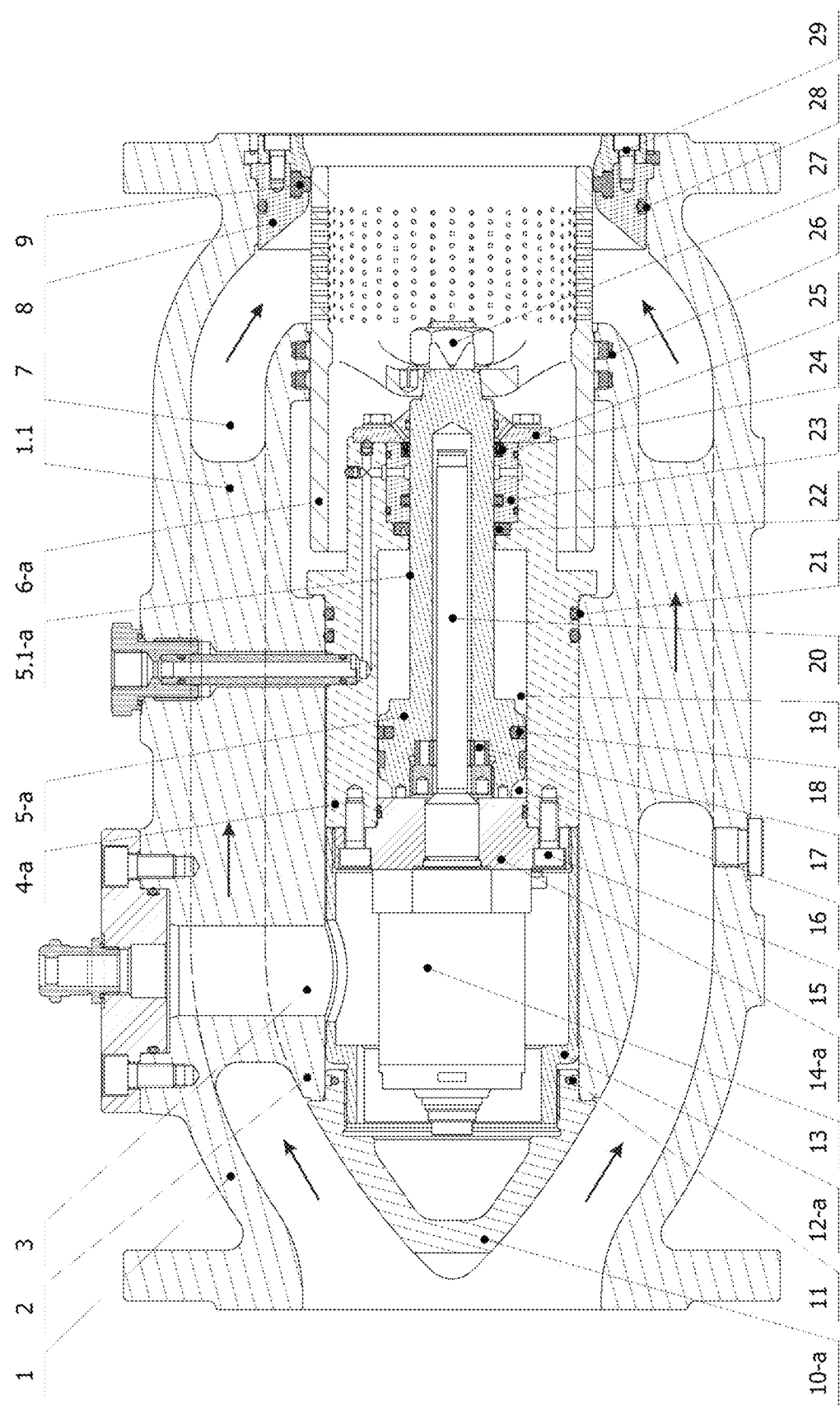
FIGS. 12 to 21 illustrate different actual designs of hydraulically powered axial flow control valves, which can be achieved by means of an external energy sources—pressurized hydraulic oil, compressed air or other gas, or by means of flow fluid energy, in that said images show different designs of sensor mechanisms, internal type INTS or external type EXTS for monitoring the movement of the regulating piston and provide feedback on its position.
Figure 13:
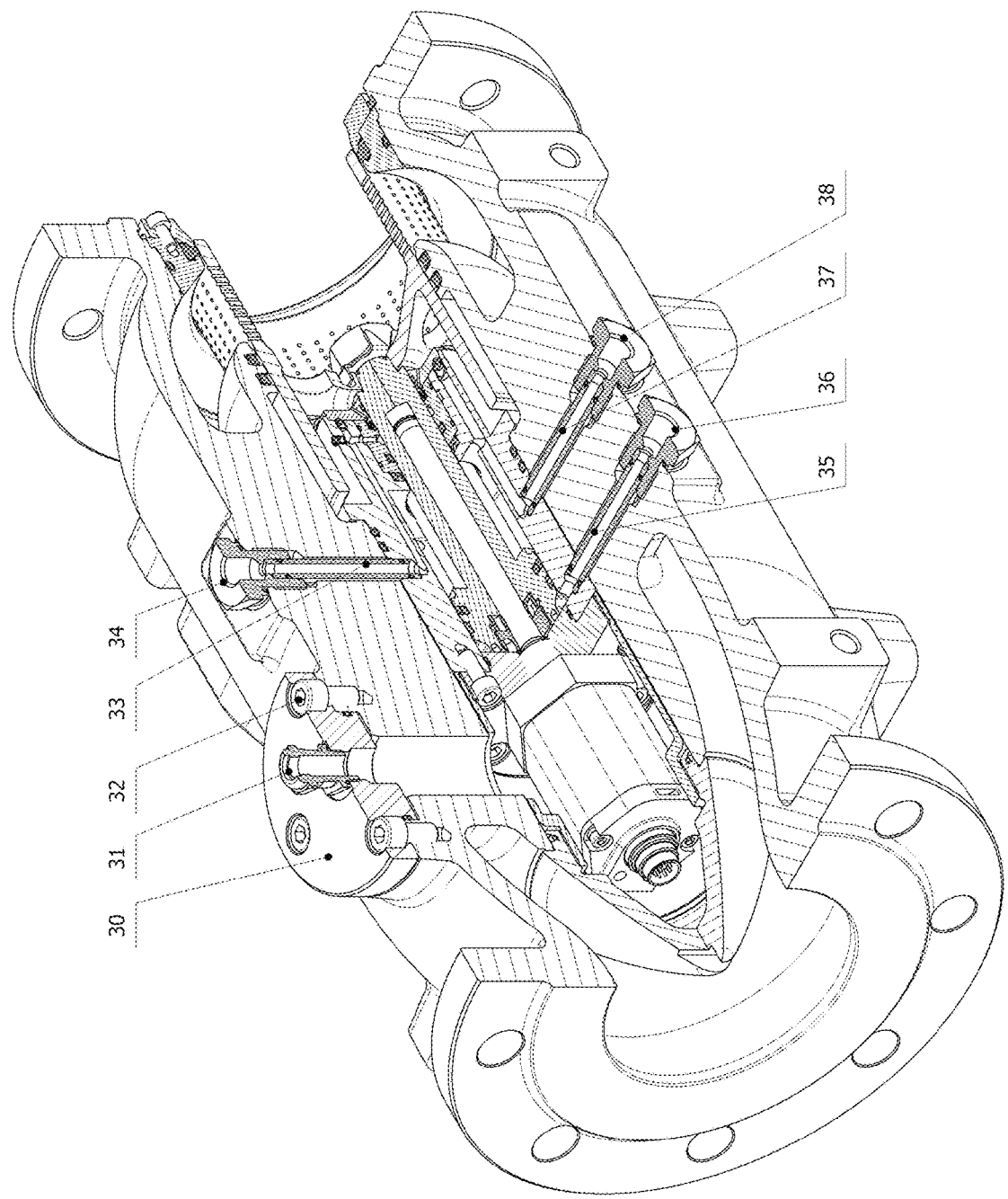
Figure 17:
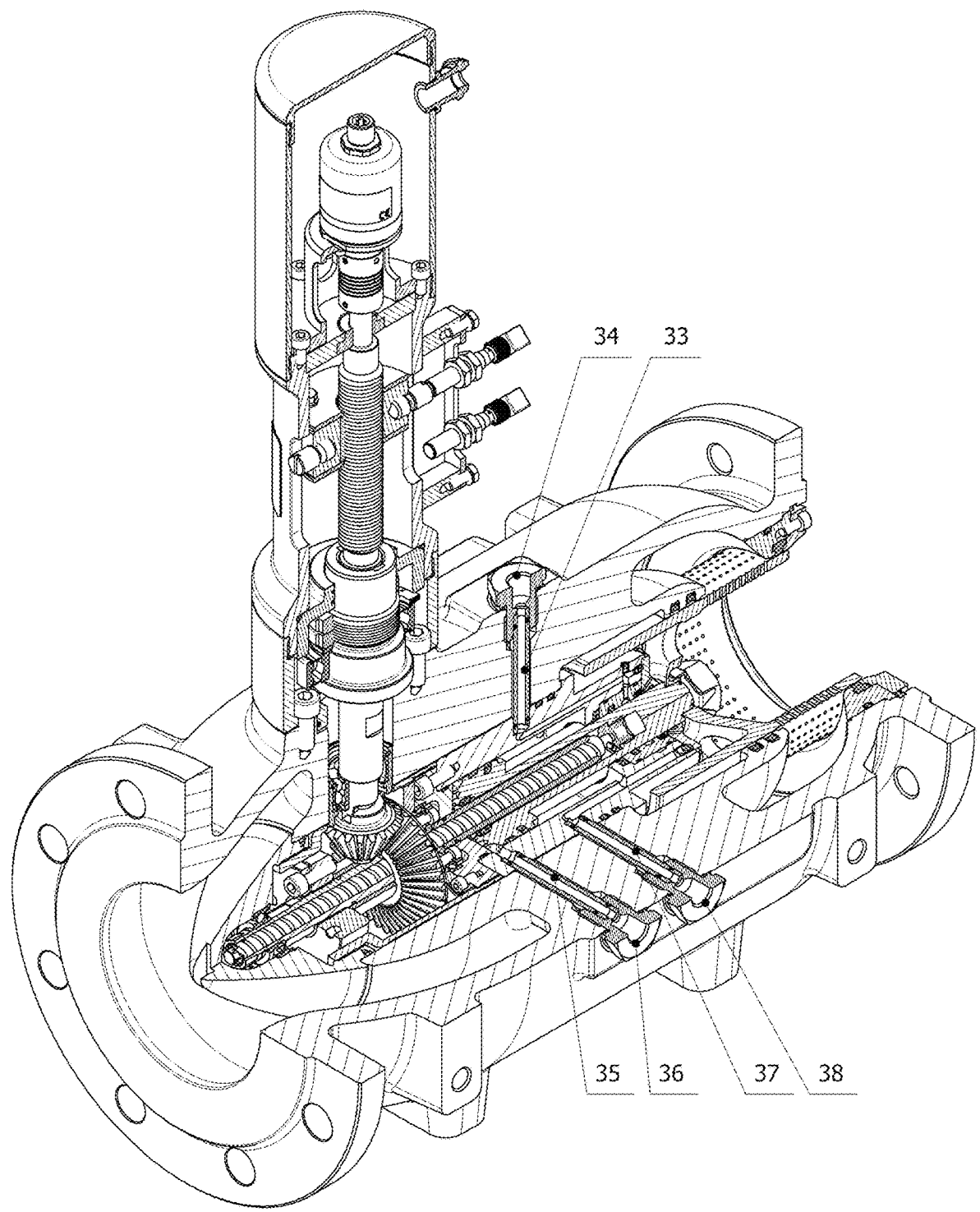
Figure 18:
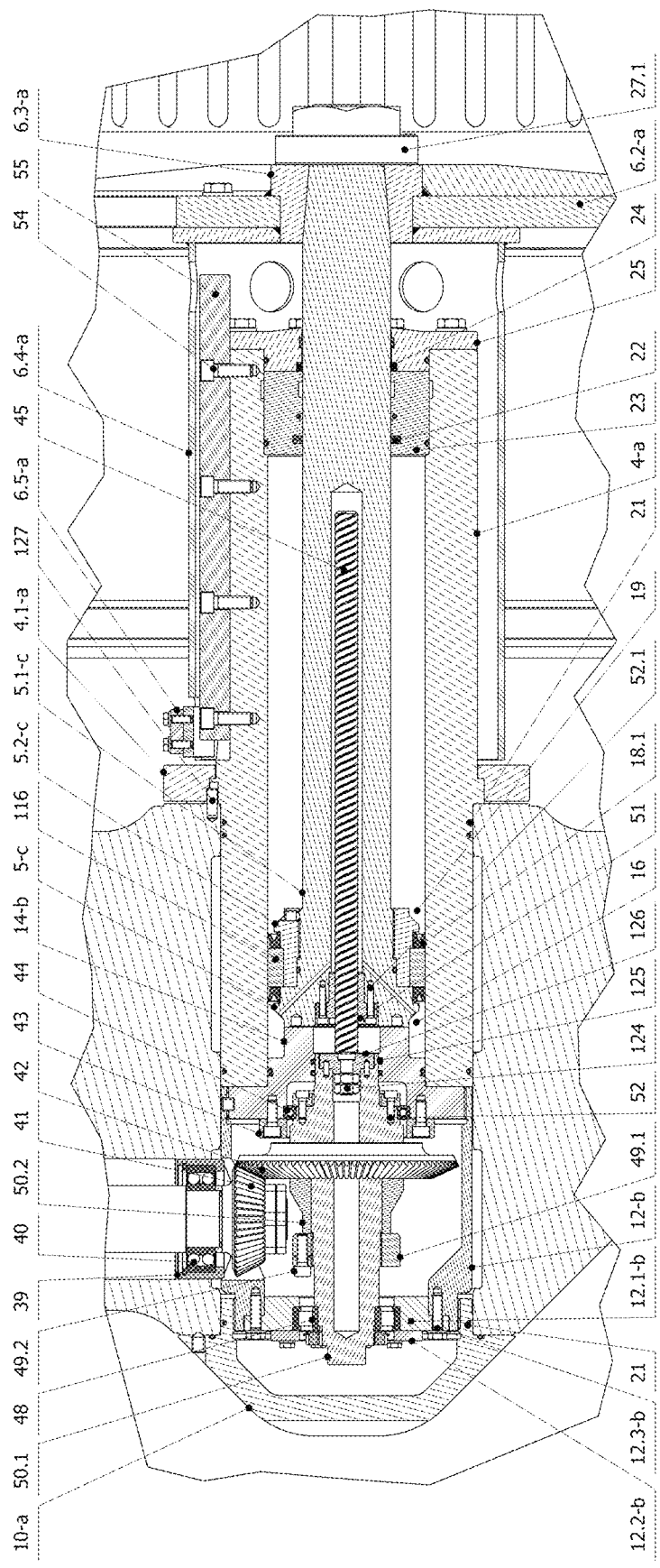
Figure 19:
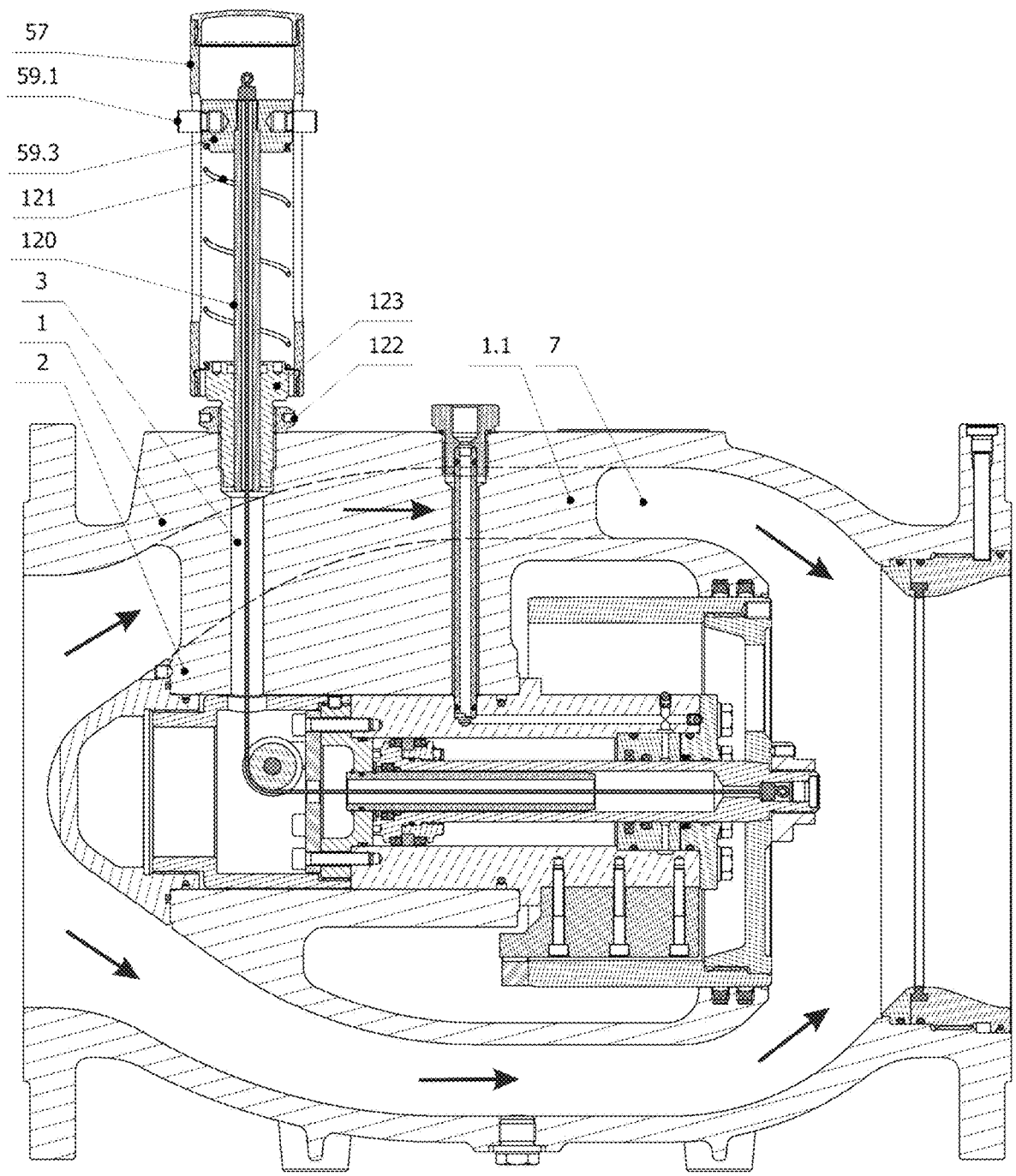
Figure 20:
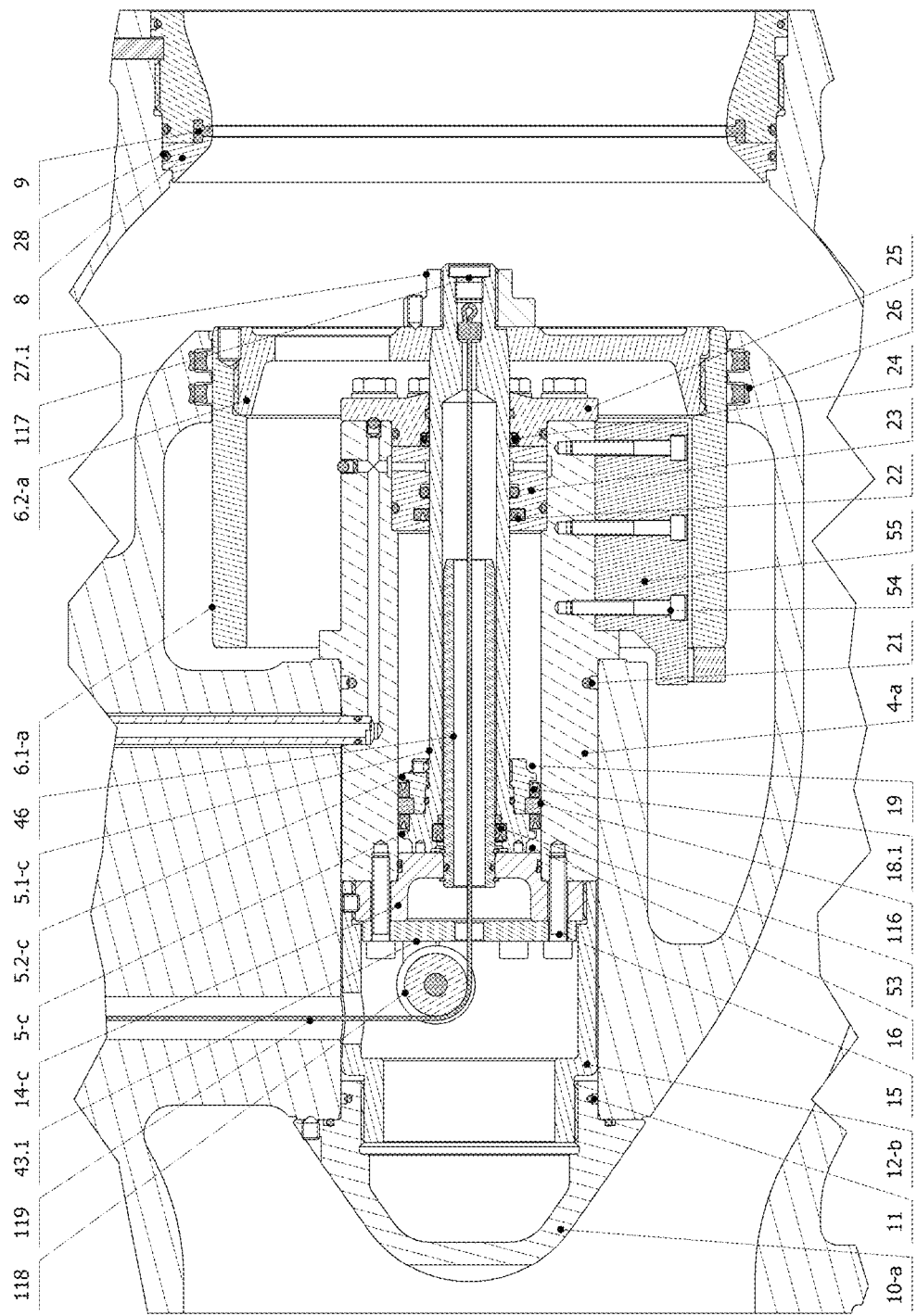
Figure 21:
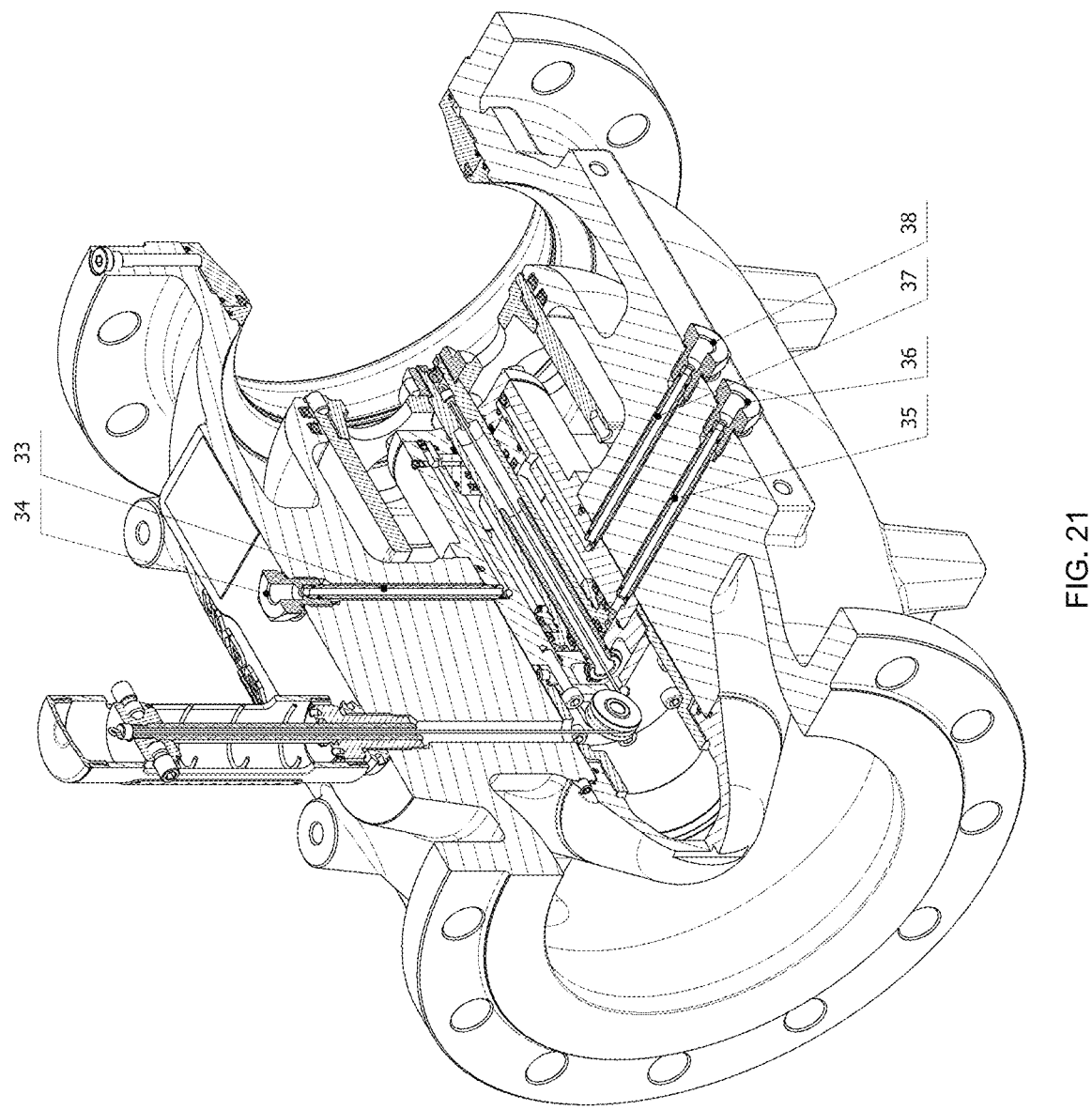

FIGS. 12 to 21 show a flow control valve with a hydraulic drive of an actuator in all variants of a sensor mechanisms for regulating a fluid flow. FIGS. 12 and 13 show the flow control valve with the hydraulic drive with an internal sensor mechanism. FIGS. 15-18 show the flow control valve with the hydraulic drive with an external sensor mechanism in the version with a sensor screw spindle. FIGS. 19 to 21 show the flow control valve with the hydraulic drive with the external sensor mechanism in the version with a steel wire rope.

According to the present invention, the dimensions of an outer valve body (1) are such that the valve can be easily installed as an element of the pipeline where the fluid flow needs to be regulated. Inside the outer valve body (1) there is a central valve body (2) connected to the outer valve body (1) by a plurality of ribs (1.1). The outer valve body (1) comprises of the coaxially located inlet and outlet for fluid flow. The number of ribs (1.1) is optimal with respect to a hydrodynamic resistance of fluid flow and a mechanical stresses of the valve itself. The outer valve body (1) and the central valve body (2) comprise a bore (3) extending radially through the said outer and central valve body. Components of an outer sensor mechanism pass through the bore (3) or the connection between an inner sensor mechanism and a processor for analysing the signal of a position of a regulating piston (6-a) is established. When the valve is in a specific open position, the fluid flows around the central valve body (2) through a channel (7). Inside the central valve body (2) there is a hydraulic actuator (4-a). The tightening of the hydraulic actuator (4-a) after its positioning axially within the central valve body (2) is performed at the front of the valve, in the area of the inlet for fluid flow, by means of a clamping cap (10-a) and a clamping bush (12-a). On larger nominal diameter valves, the hydraulic actuator (4-a) is tightened inside the central body of the central valve body (2) by a special flange (4.1-a) shown in FIG. 18. A pressurized actuating fluid is introduced into the hydraulic actuator (4-a) via a radially positioned tube (35) for the closing direction and a radially positioned tube (38) for the opening direction, most often a hydraulic mineral oil, which suppresses an actuator piston (5-a) and, via an actuator piston rod (5.1), the regulating piston (6-a) in the direction of opening or closing of the flow control valve. On an outer rim, a body of the hydraulic actuator (4-a) comprises a rim grooves for receiving one or more gaskets (21) for preventing the penetration of the flow fluid into a sensor bore. The gaskets (21) are located between an inner part of the central valve body (2) of the hydraulic actuator (4-a) and on the part of the outer body of the hydraulic actuator (4-a). A radial bores extending from the outer valve body (1) contains pipes (35, 38) through which a pressurized control fluid flows to the actuator piston (5-a) of the hydraulic actuator (4-a) (see FIG. 13). The regulating piston (6-a) is secured to an actuator piston rod (5.1-a) by an outer nut (27). The regulating piston (6-a) itself is in hydrostatic balance during the regulating motion in an axial direction in such a way that the same pressure of the flow fluid acts on it on all sides, minimizing the actuating force of the actuator piston (5-a). The regulating piston (6-a) is guided by a piston rod guide (23) of the actuator piston rod (5.1-a). The guide (23) is a ring-shaped and at one end rests on a clamping cap (25) and at the other end rests on the body of the hydraulic actuator (4-a). This enables a very reliable and precise guidance of the regulating piston (6-a).

Figure 16:
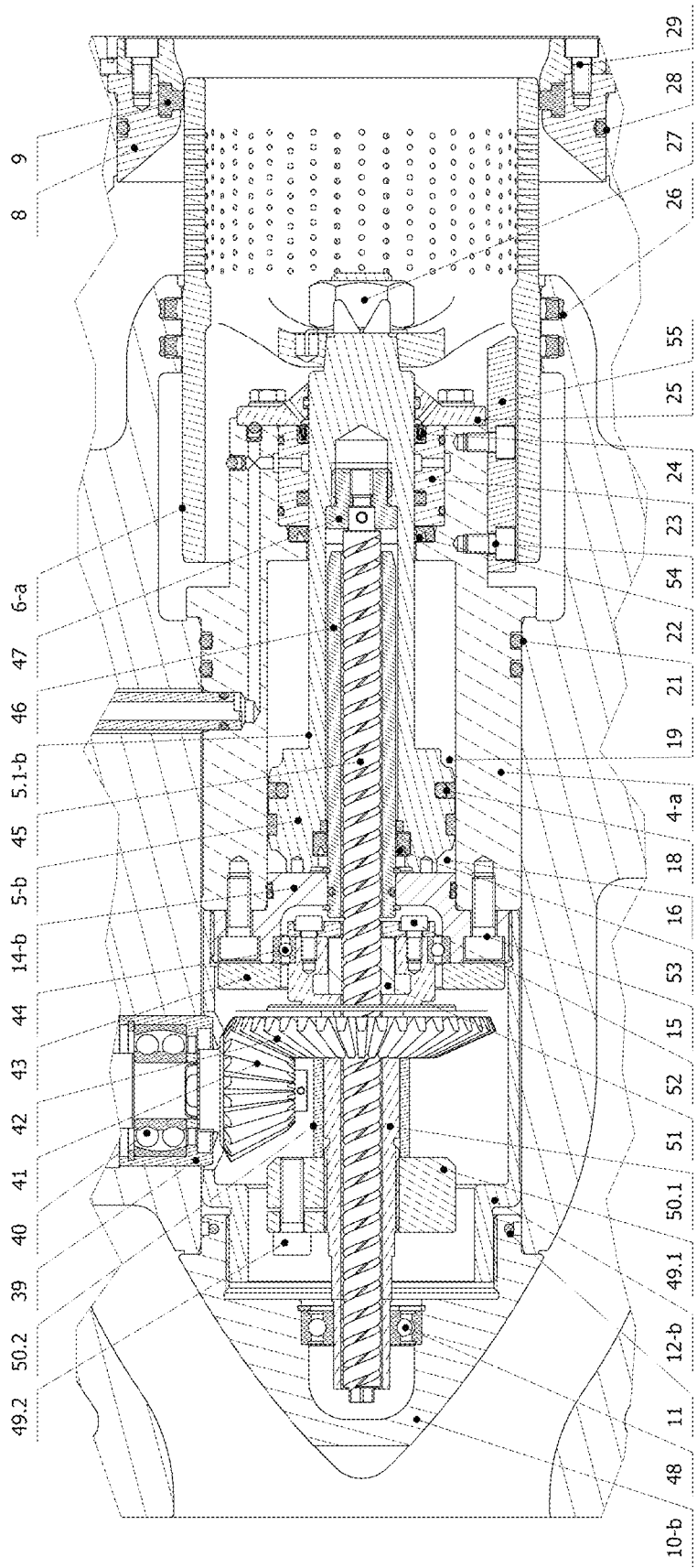

FIG. 16 shows how the actuator piston rod (5.1-b) of the hydraulic actuator (4-a) is secured in order to prevent a rotation of the regulating piston (6-a) around the axis. The rotation of the regulating piston (6-a) is blocked by means of a parallel key fastening screws (54) located on the rear outer rim of the actuator body (4-a) and attached to the actuator body (4-a) by screws (54). The regulating piston (6-a) has a matching groove on its inner side where a parallel key (55) slides and thus prevents unwanted rotation of the regulating piston (6-a). The said blockage of the rotation of the regulating piston is carried out primarily in case of use of the EXS external sensor mechanism via a horizontal sensor screw spindle 45 shown in FIGS. 16 to 18 or a steel wire rope (119) shown in FIGS. 19 to 21, while in case of use of a contactless sensors for the INS internal sensor mechanism the said blockage is not required.

On the outer side of the hydraulic actuator (4-a), some models may have a spring that the regulating piston (6-a) always pushes in the closed position of the valve. Said spring rests at one end on the hydraulic actuator (4-a) and at the other end on a bottom of the regulating piston (6-*a*). The spring is a safety mechanism that quickly returns the regulating piston (6-*a*) to the closed position in the event of a breakdown of the hydraulic drive of the piston or activation of the safety function of direct closing of the axial valve. In case of the present invention, the closure of the axial valve is most often carried out by means of a hydraulic accumulator—particularly in the designs of the control valve of large nominal diameters or higher operating pressures, where the energy of the spring could not fully perform the function of a reliable valve closing.

Sealing of the regulating piston (6-*a*) in the closed position is carried out by using one or more rear gaskets (26) which are located between an inner rim at a rear part of the central valve body (2) and the outer rim of the regulating piston (6-*a*), and one or more gaskets (9) located in an outlet rear part (8) of the valve. The sealing in the open position or in some intermediate position is not necessary because the fluid flows around the regulating piston (6-*a*), which is, as mentioned above, in hydrostatic balance. In addition, this design solution of the sealing system enables said gaskets (9; 26) to be exposed to minimal wear. It is not specifically noted here, but it is clear that the number and arrangement of the gaskets (9) and (26) may be arbitrary depending on the pressure, type of flow fluid and temperature. In addition to said gaskets (9; 26), the valve also includes a two piston rod gaskets (24; 22). The piston rod gasket (24) is located within a circular groove of the guide (23) on the rim of the actuator piston rod (5.1-*a*) and between the guide (23) and the clamping cap (25), while the inner gasket of the piston rod (22) is located between the opposite end of the guide (23) and the inner part of the hydraulic actuator (4-*a*).

Figure 22:
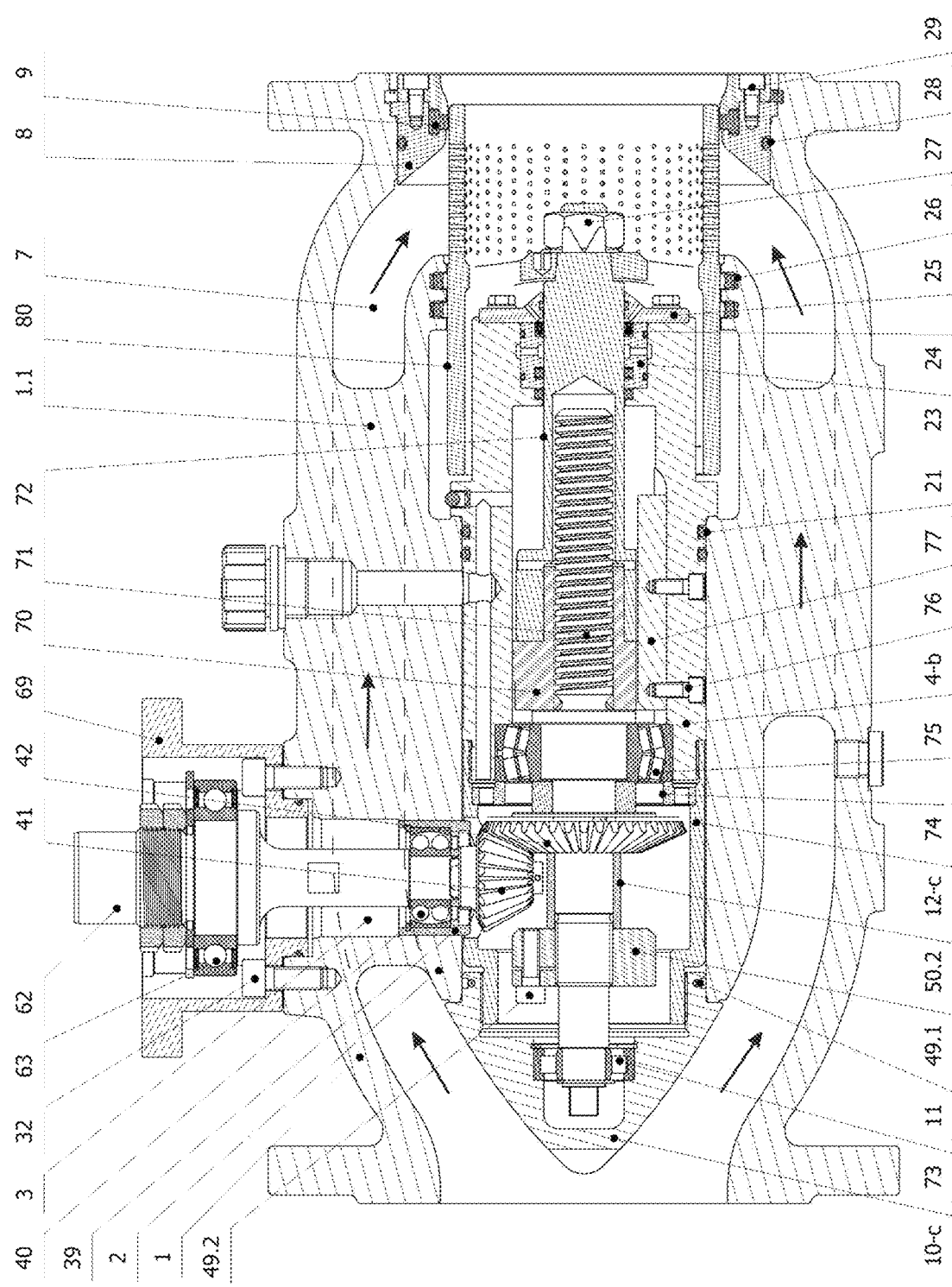
FIG. 22 shows a cross-section of an axial flow control valve with a mechanical actuator.
Figure 24:
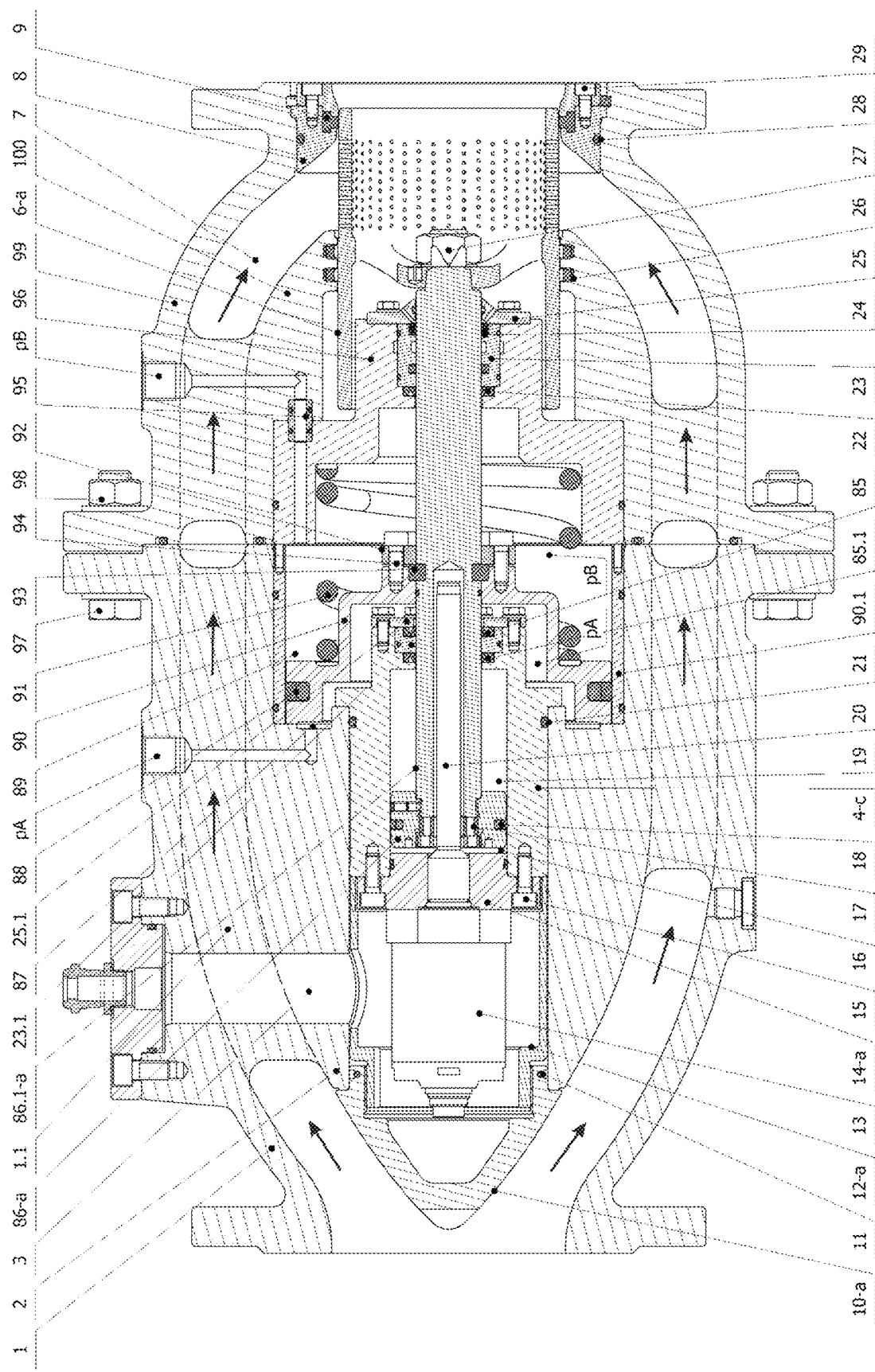
FIGS. 24 to 31 show an actual design of an axial flow control valves with a pneumatic hydraulic drive (PHD) with differently implemented position sensors, i.e. sensor mechanisms of the type INTS and EXTS.
Figure 27:
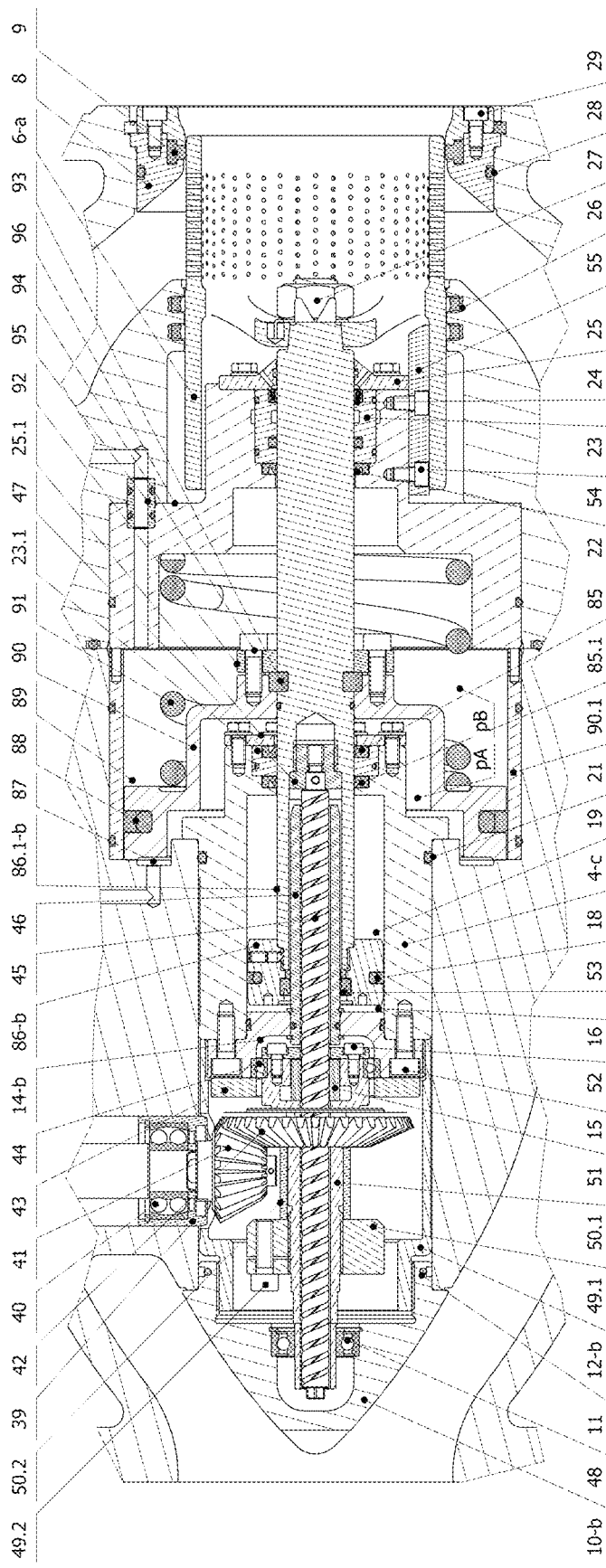
Figure 30:
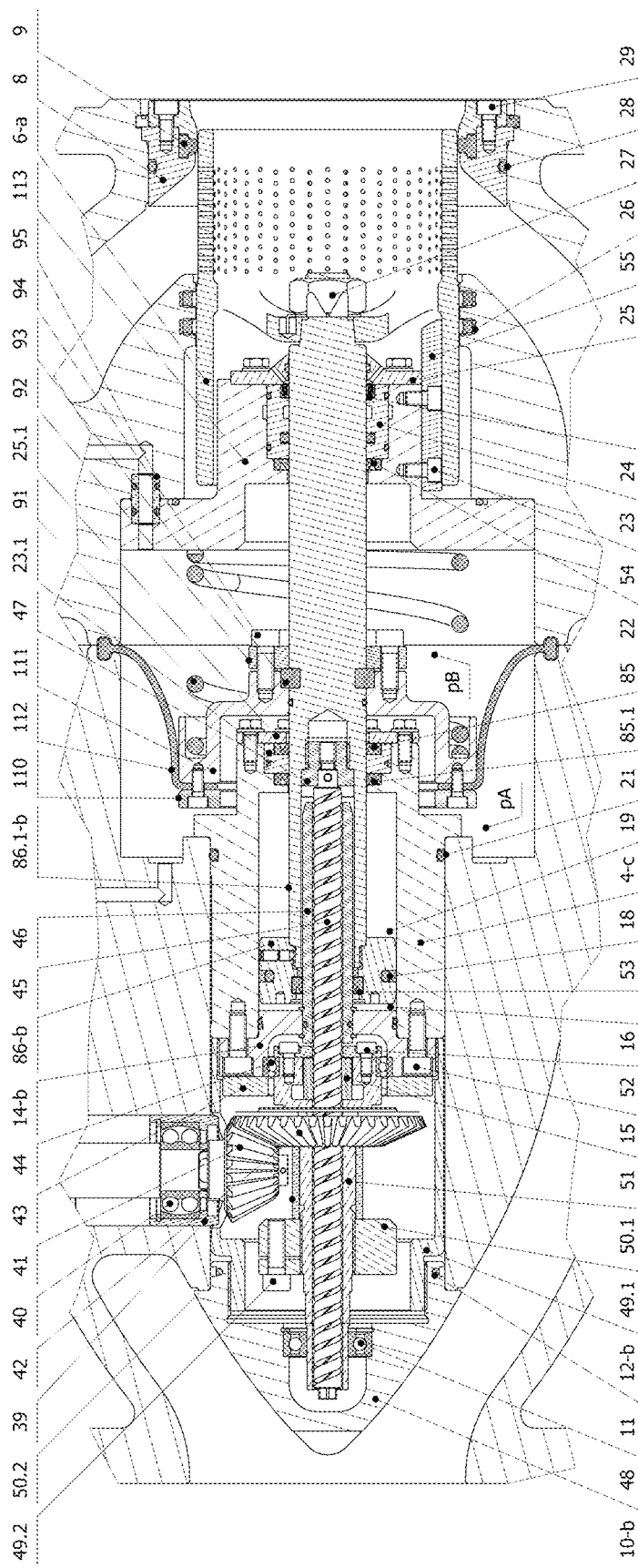
Figure 32:
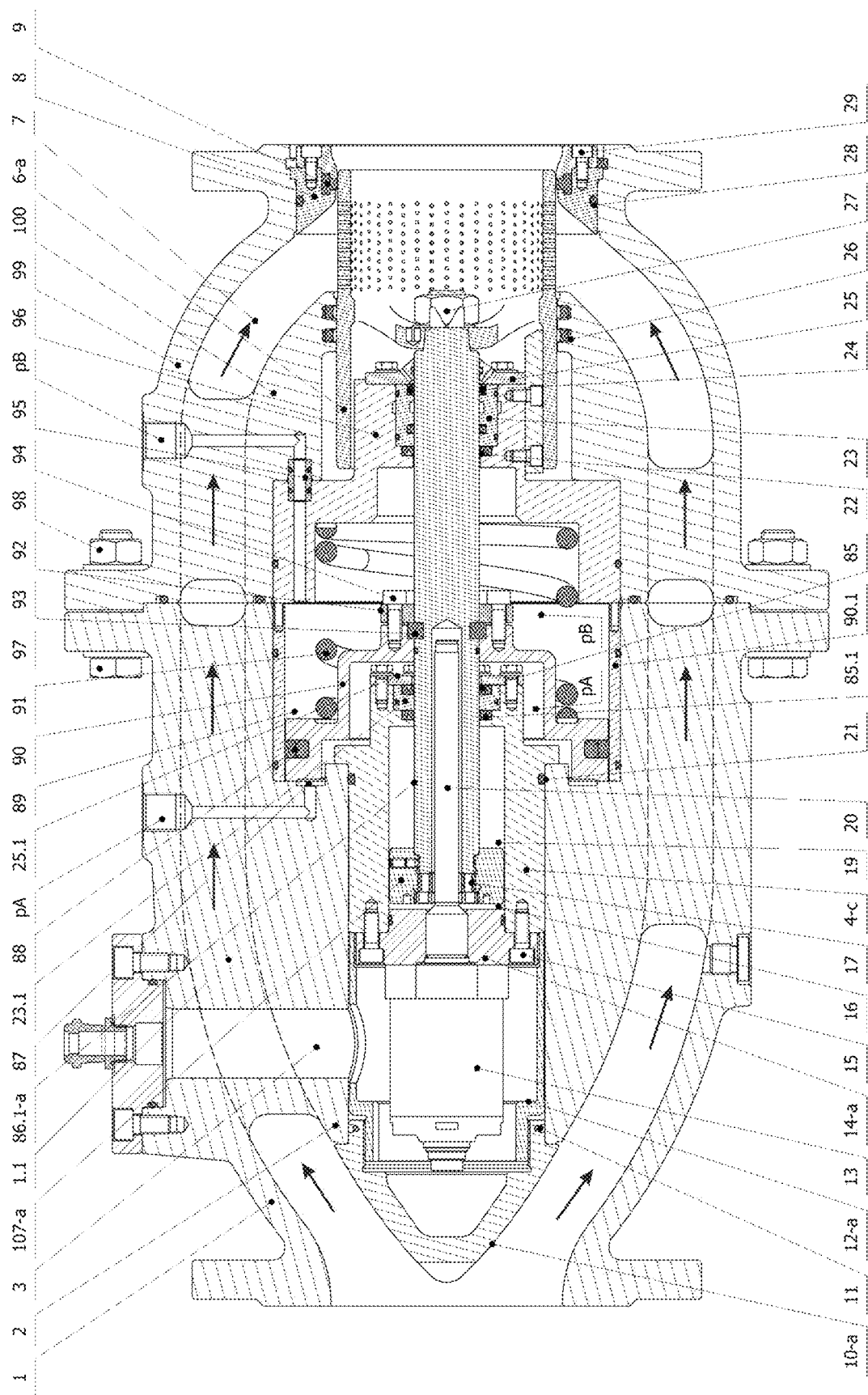
FIGS. 32 to 36 show different actual designs of an axial flow control valves with pneumatic drive (PD) with differently implemented position sensors, i.e. sensor mechanisms of the type INTS and EXTS.
Figure 35:
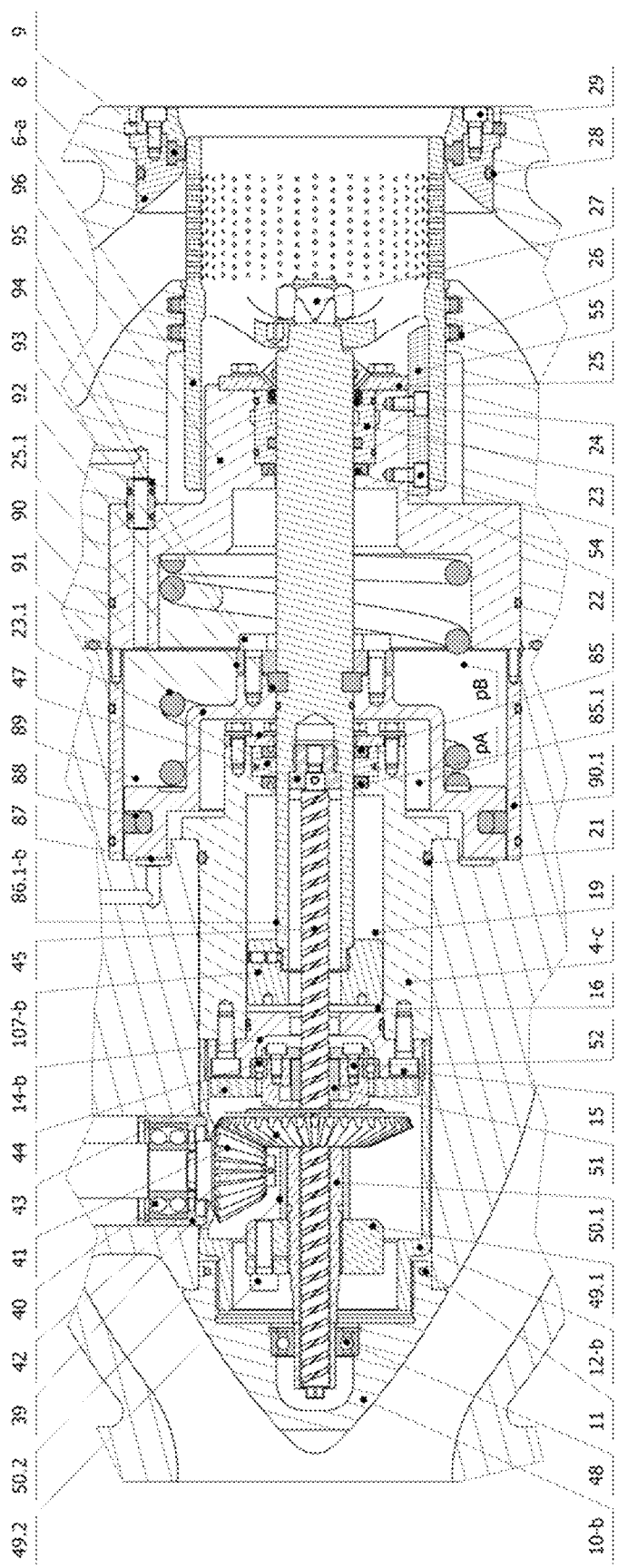

The identical design and arrangement of the gaskets (9; 22; 24; 26) is shown in the following figures: FIG. 12 showing a cross section of the valve for the hydraulic drive of the actuator with an ultrasonic probe as the sensor mechanism (20); FIG. 16 illustrating a cross section of the valve for the hydraulic drive of the actuator with a horizontal sensor screw spindle (45) serving as the sensor mechanism; FIG. 20 illustrating a cross section of the valve for the hydraulic drive of the valve actuator with the steel wire (119) rope as the sensor mechanism; FIG. 22 showing a cross section of the valve in spatial view for the mechanical drive of the valve actuator with a horizontal screw spindle (71) and a horizontal spindle nut (71) as the sensor mechanism; FIG. 24 illustrating a cross section of the valve for the pneumo-hydraulic drive of the valve actuator with an ultrasonic probe serving as the sensor mechanism (20); FIGS. 27 and 30 illustrating a cross section of the valve for the pneumo-hydraulic drive of the valve actuator with a sensor screw spindle serving as the sensor mechanism (45); FIG. 32 illustrating a cross section of the valve for the pneumatic drive of the valve actuator with an ultrasonic probe as the sensor mechanism (20); and FIG. 35 illustrating a cross section of the valve for the pneumatic drive of the valve actuator with a sensor screw spindle serving as the sensor mechanism (45).

The sealing control mechanism, or protection from the ingress of the outer flow fluid towards the interior of the hydraulic actuator (4-*a*) and from the actuator to the flow fluid area is performed by a visual check of the pipe (33) or remotely using a pressure switch or probe by checking the pressure increase in the same pipe (33) (FIG. 13). The presence of the flow fluid in the pipe (33) means that the gasket of the piston rod (24), which is located between the guide (23) and the actuator piston rod (5.1-*a*) is damaged and leaking. The piston rod gasket (24) is located within the circular groove of the guide (23) and rests on the clamping cap (25) at the rear of the guide (23).

Figure 14:
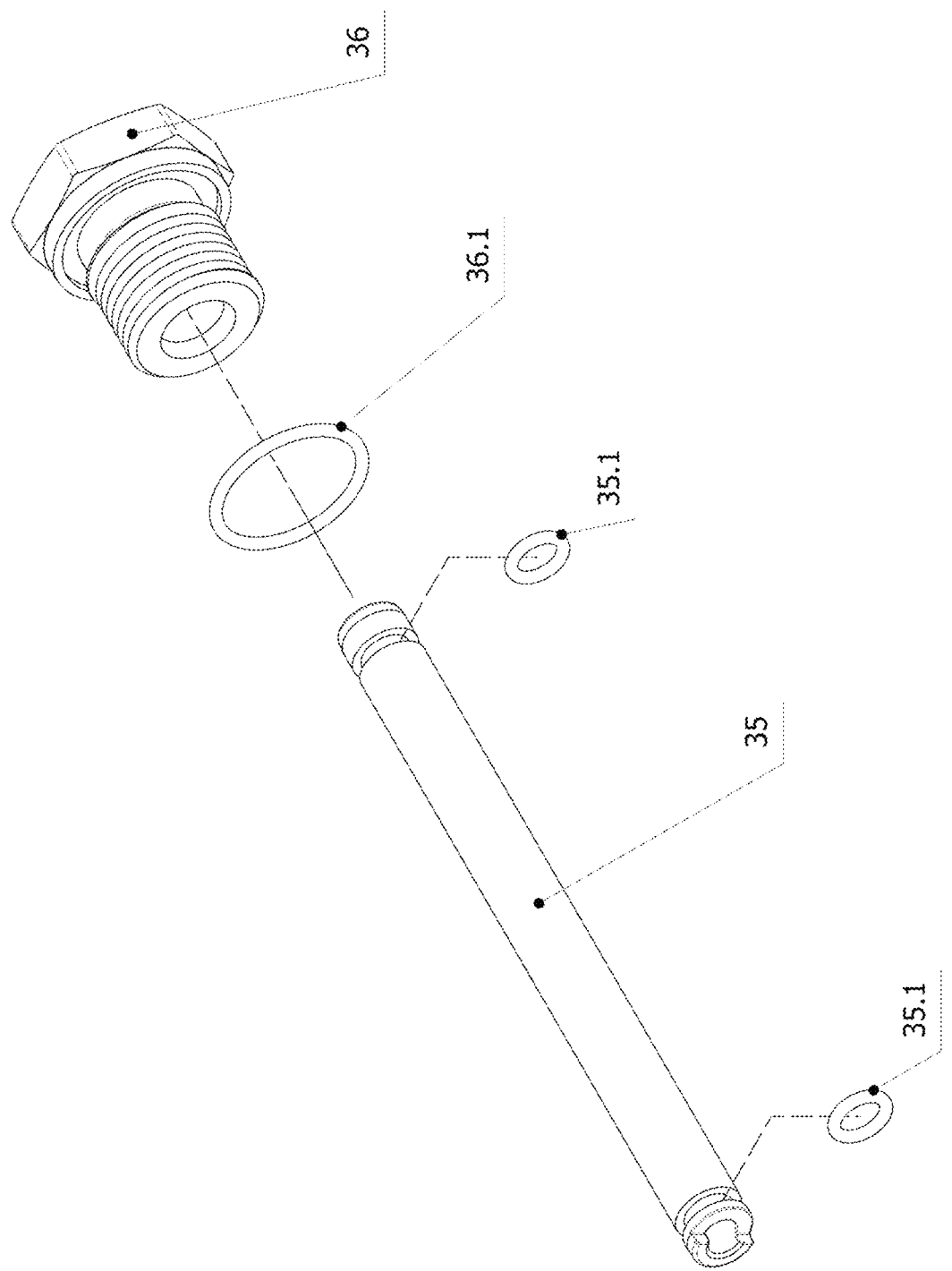

The presence of the control fluid, for example, hydraulic oil in the pipe (33) at the connection (34), means that the inner gasket of the piston rod (22), located on the rim of the piston rod of the actuator (5.1*a*) between the central valve body (2) and resting on the other end of the guide (23) is leaking because it is damaged. The presence of the flow or control fluid can be determined visually in the pipe (33) by observation or remotely using the relevant pressure switch that will register the pressure increase in the pipe (33) and warn against damage of the said gaskets (24; 22). FIG. 14 shows a spatial view of the example of design of the pipe (35) in FIG. 13, which has identical design elements as the pipe (37). In the hydraulic actuator (4-*a*), pressurized control fluid flows in through a radially positioned pipe (35) into a first chamber (16) for closing the valve, and through a radially positioned pipe (37) into a second chamber (19) for opening the valve. The pipe (35) serving for supplying the actuating fluid for closing the valve is connected at one end to the first chamber (16) for supplying the actuating fluid for the direction of closing the valve and on the other end is closed by a screw cap (36) connected to the pipe (35). There are gaskets (35.1) at the opposite ends of the pipe (35), and there is a gasket (36.1) located between the screw cap (36) and the channel (35).

Figure 25:
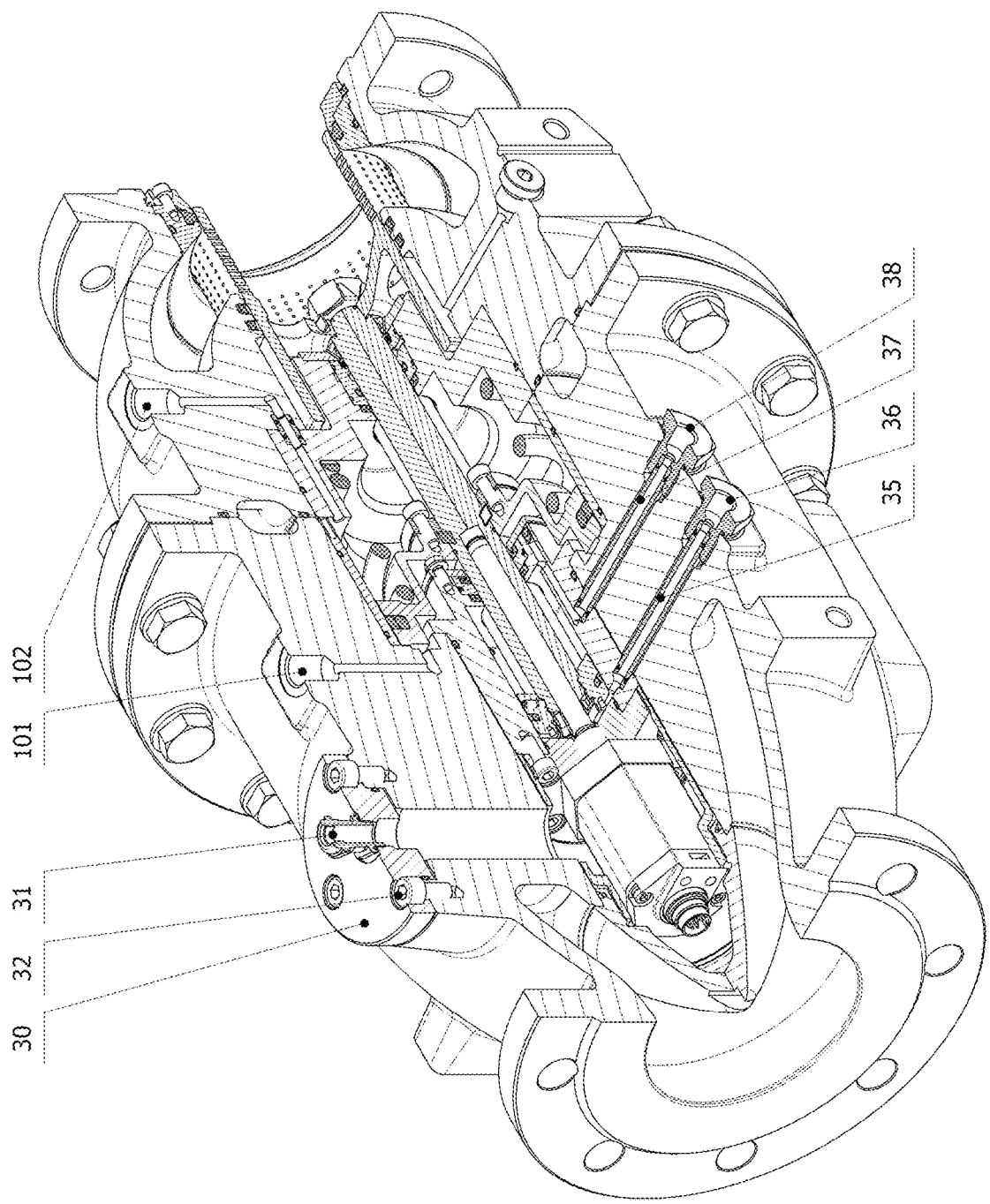
Figure 26:
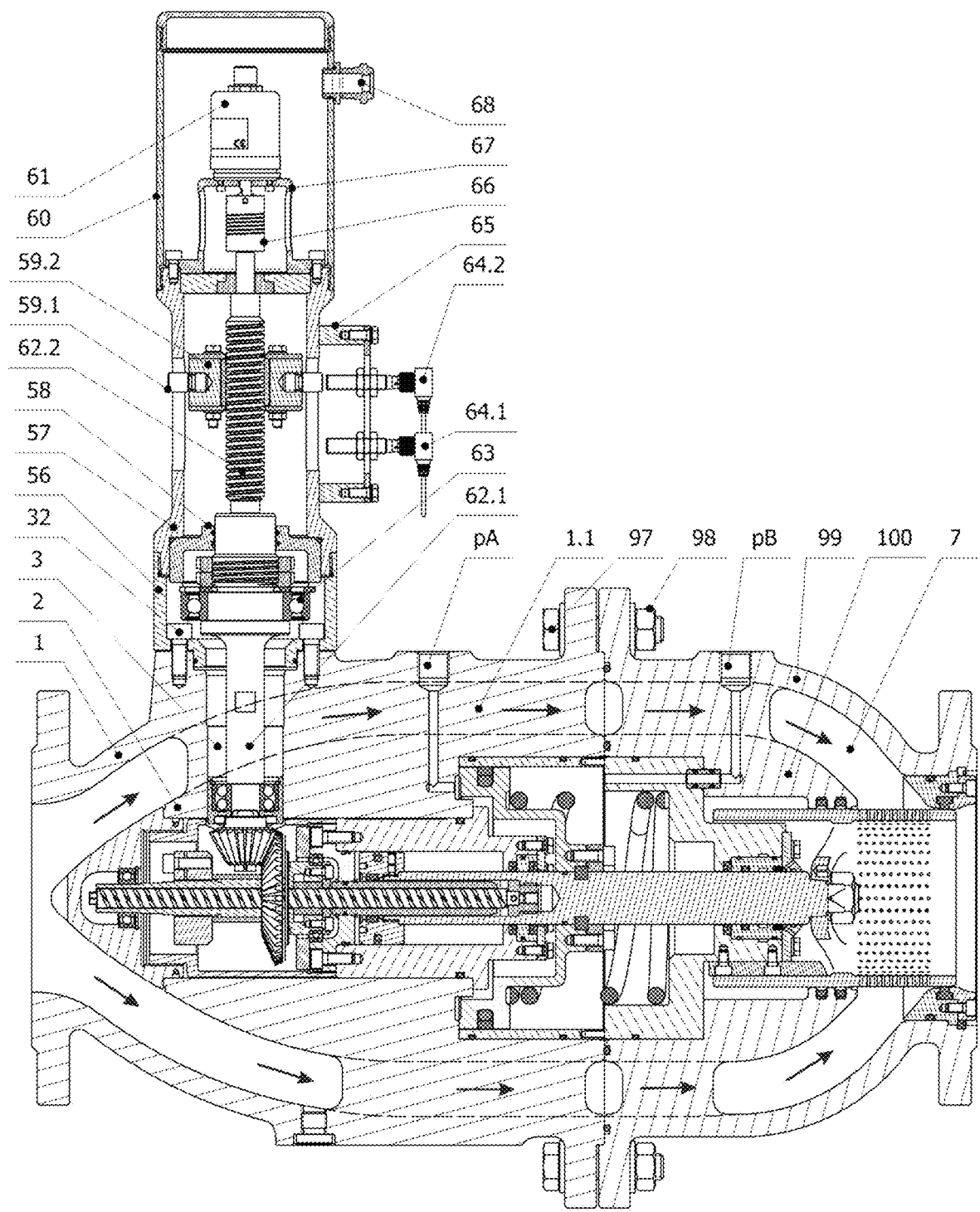
Figure 28:
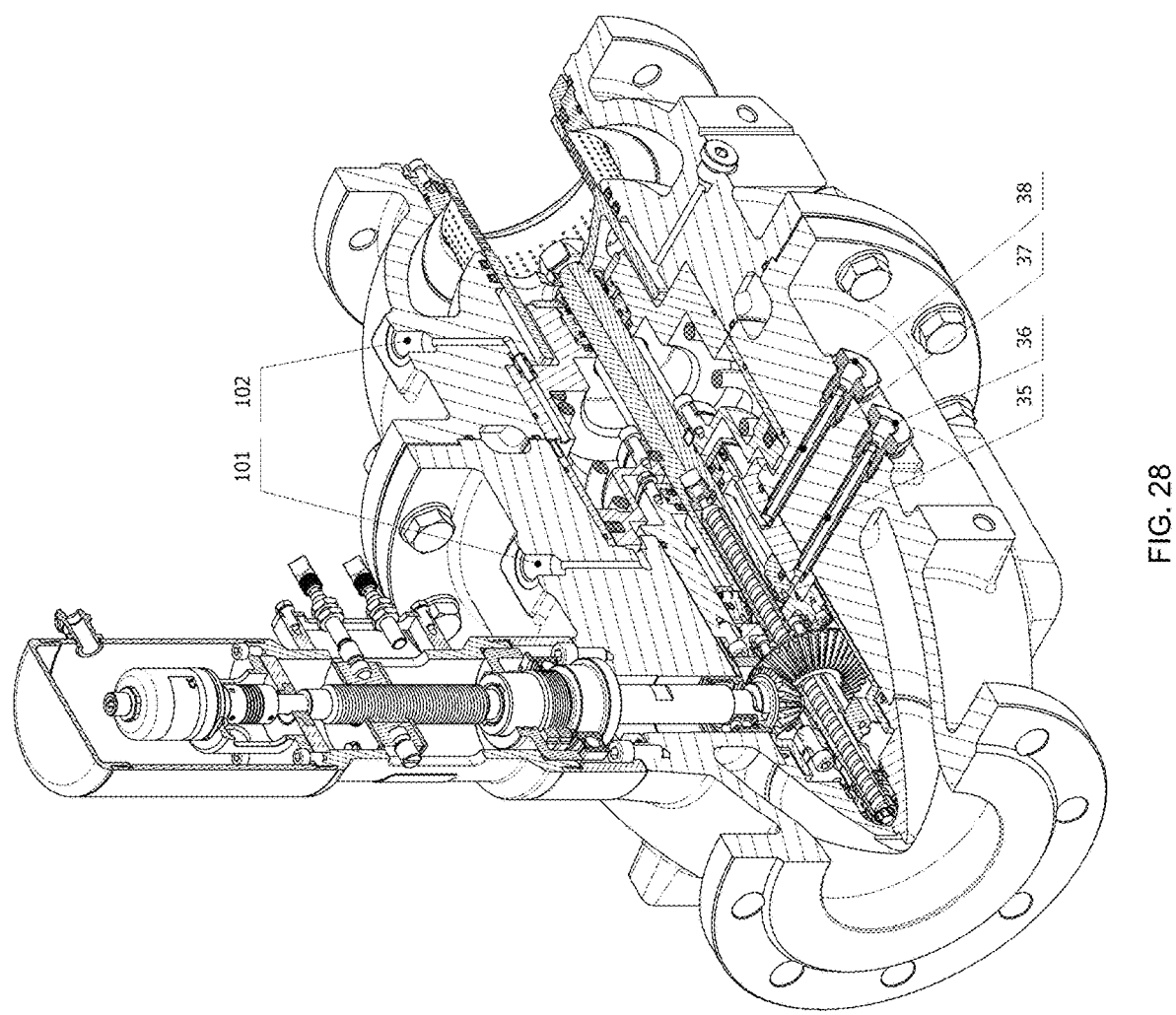
Figure 29:
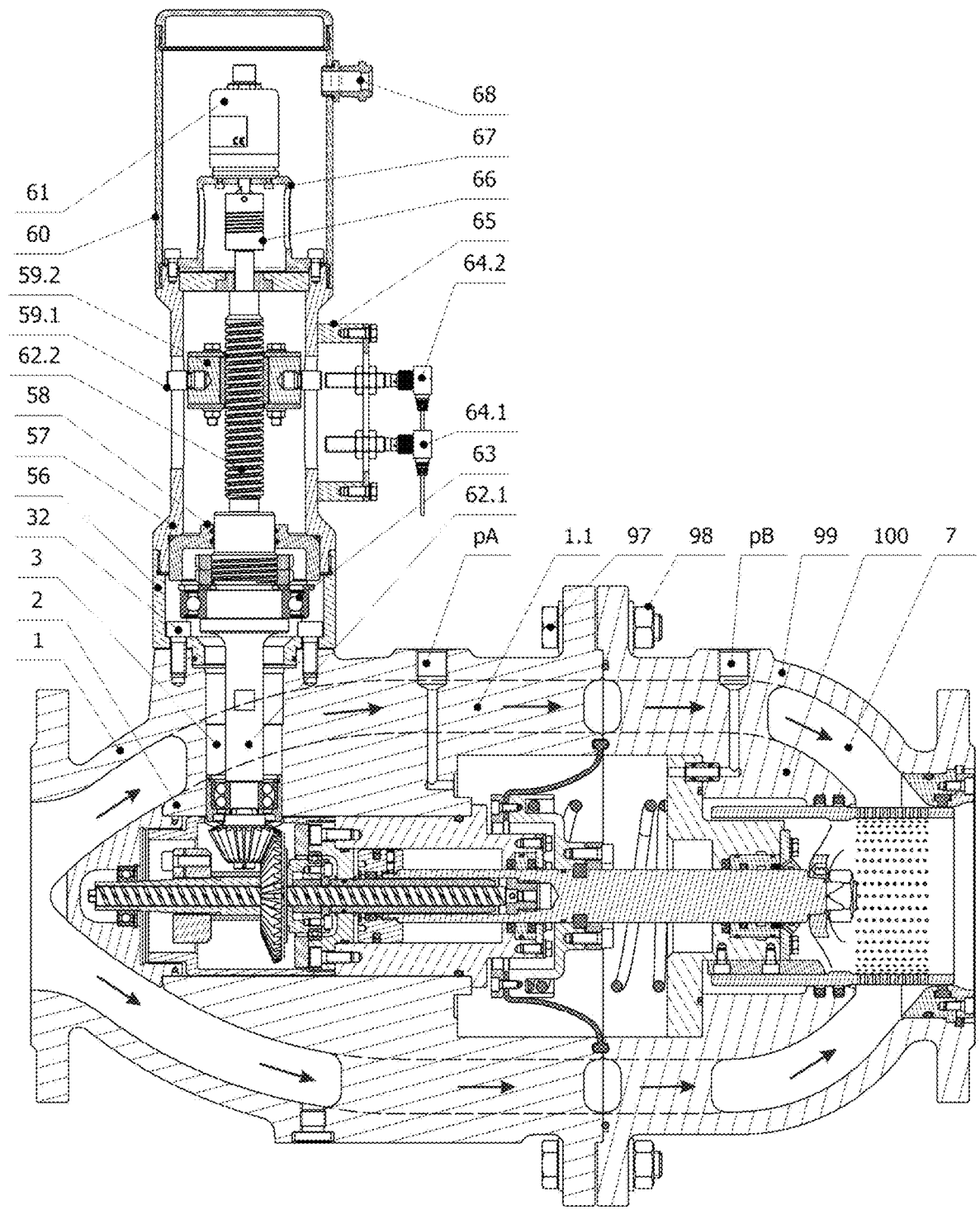
Figure 31:
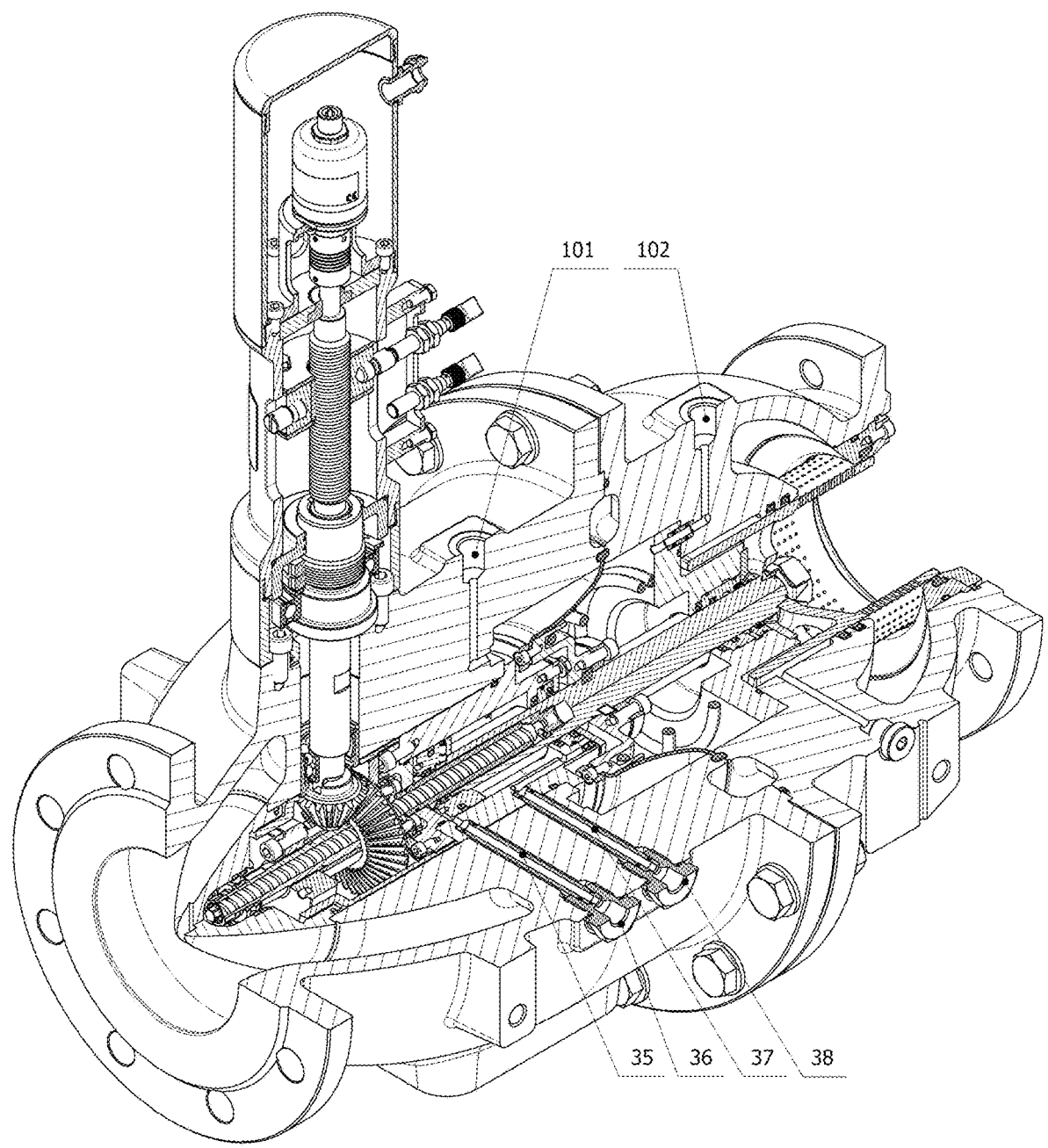
Figure 33:
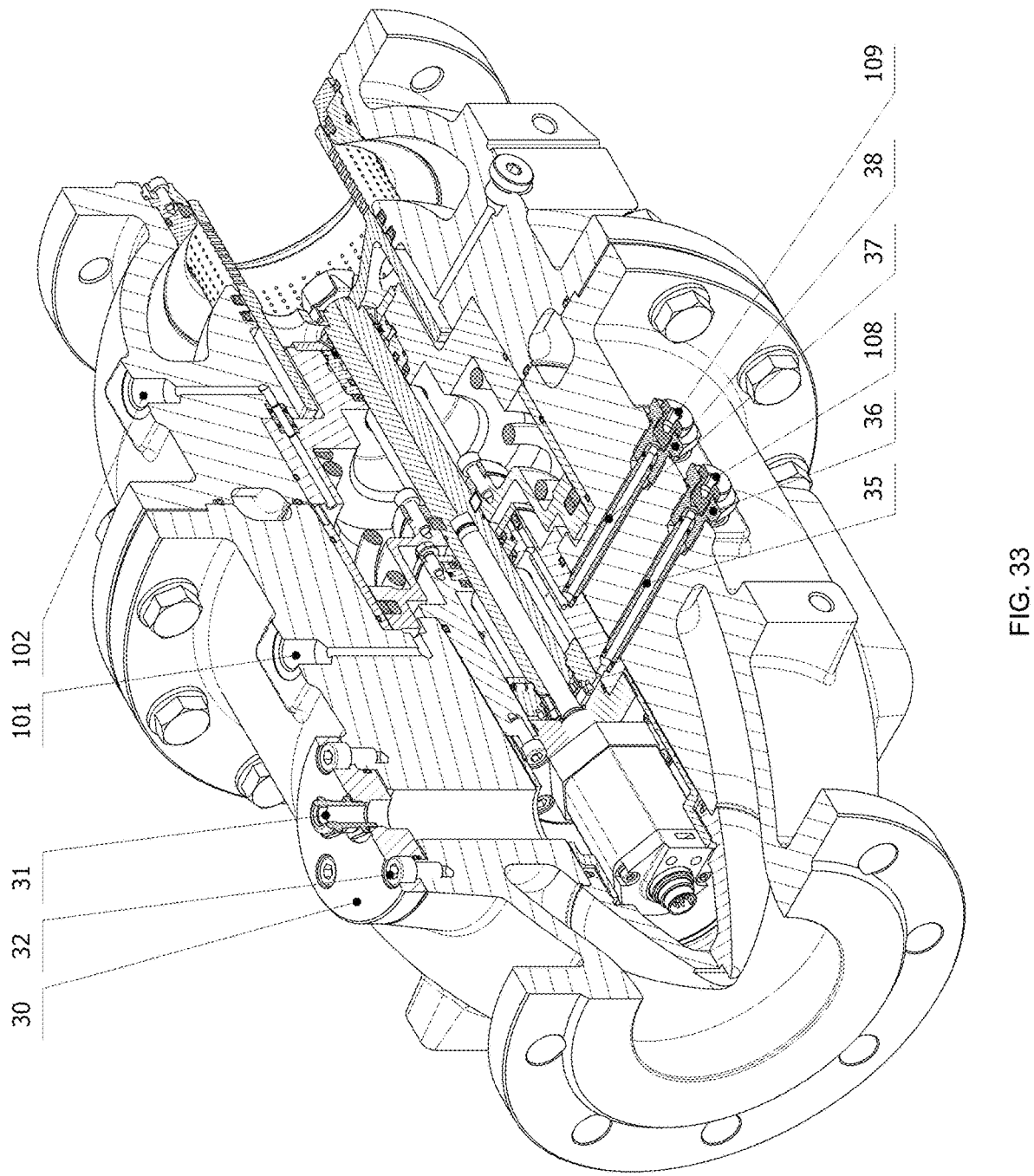
Figure 36:
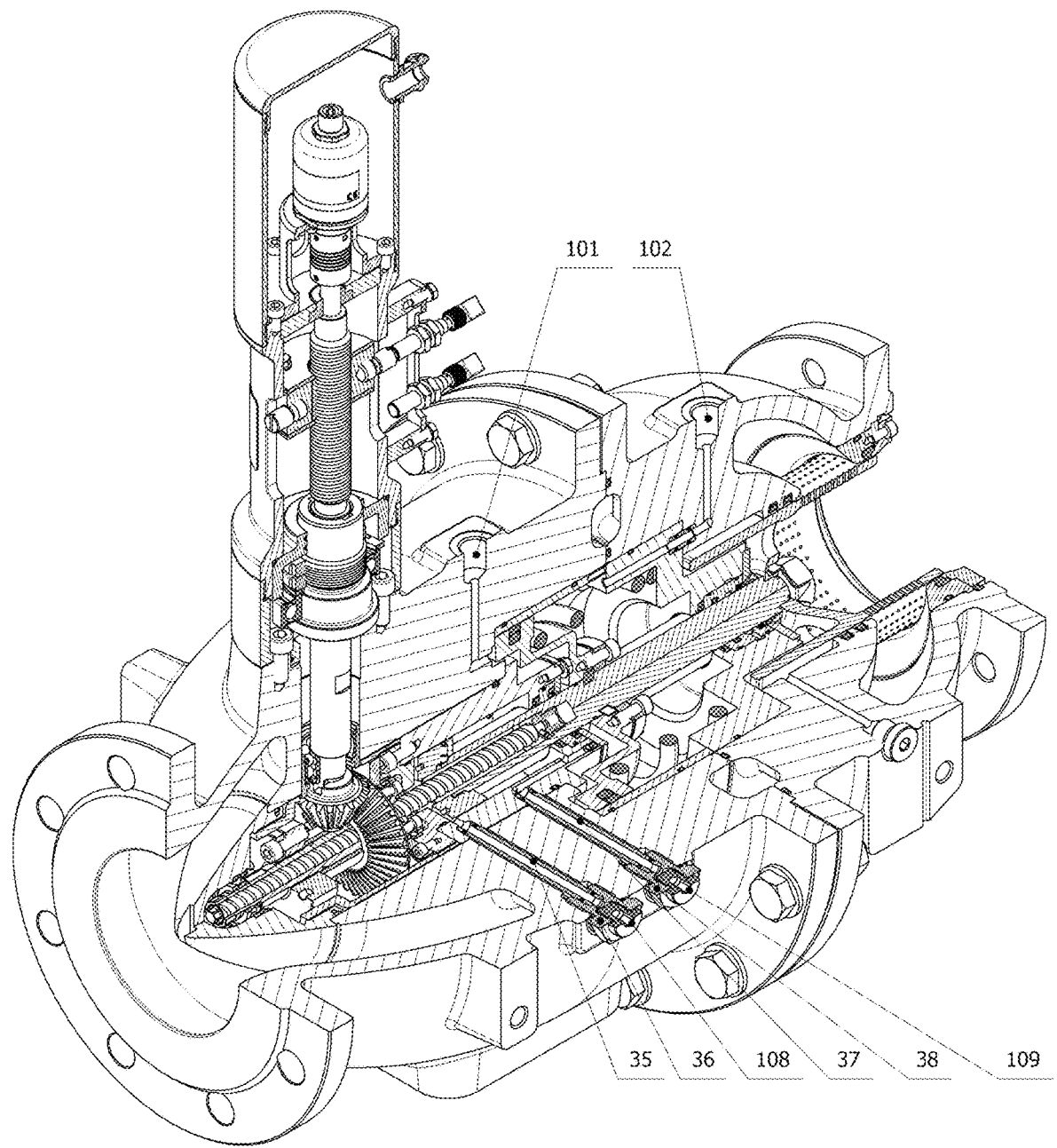

The identical design and arrangement of the pipes (35; 37) is shown in the following figures: FIG. 17 showing a cross section of the valve in spatial view for the hydraulic drive of the actuator with a sensor screw spindle as the sensor mechanism (45); FIG. 21 illustrating a cross section of the valve in spatial view for the hydraulic drive of the actuator with the steel wire rope (119) as the sensor mechanism; FIG. 25 showing a cross section of the valve in spatial view for the pneumo-hydraulic drive of the valve actuator with an ultrasonic probe serving as the sensor mechanism (20); FIG. 28 illustrating a cross section of the valve in spatial view for the pneumo-hydraulic drive of the valve actuator with a sensor screw spindle serving as the sensor mechanism (45); FIG. 31 illustrating a cross section of the valve in spatial view for the pneumo-hydraulic drive of the valve actuator with a sensor screw spindle as the sensor mechanism (45); FIG. 33 illustrating a cross section of the valve in spatial view for the pneumatic drive of the valve actuator with an ultrasonic probe as the sensor mechanism (20); and FIG. 36 illustrating a cross section of the valve in spatial view for the pneumatic drive of the valve actuator with a sensor screw spindle serving as the sensor mechanism (45).

All designs of internal and external sensor mechanisms applicable to all types of drives will be described in detail under section 3 below.

In addition to the aforementioned sealing control options, the axial movements of the guide (23) of the actuator piston rod r (5.1-*a*) located at the rear of the outer rim of the actuator piston rod (5.1-*a*) are prevented by securing the guide with a clamping cap (25) and matching screws. This results in high reliability of the actuator and flexibility in using various types of gaskets depending on the flow fluid, temperature and pressure.

1.2 Mechanical Drive (MD) of the Actuator

Figure 23:
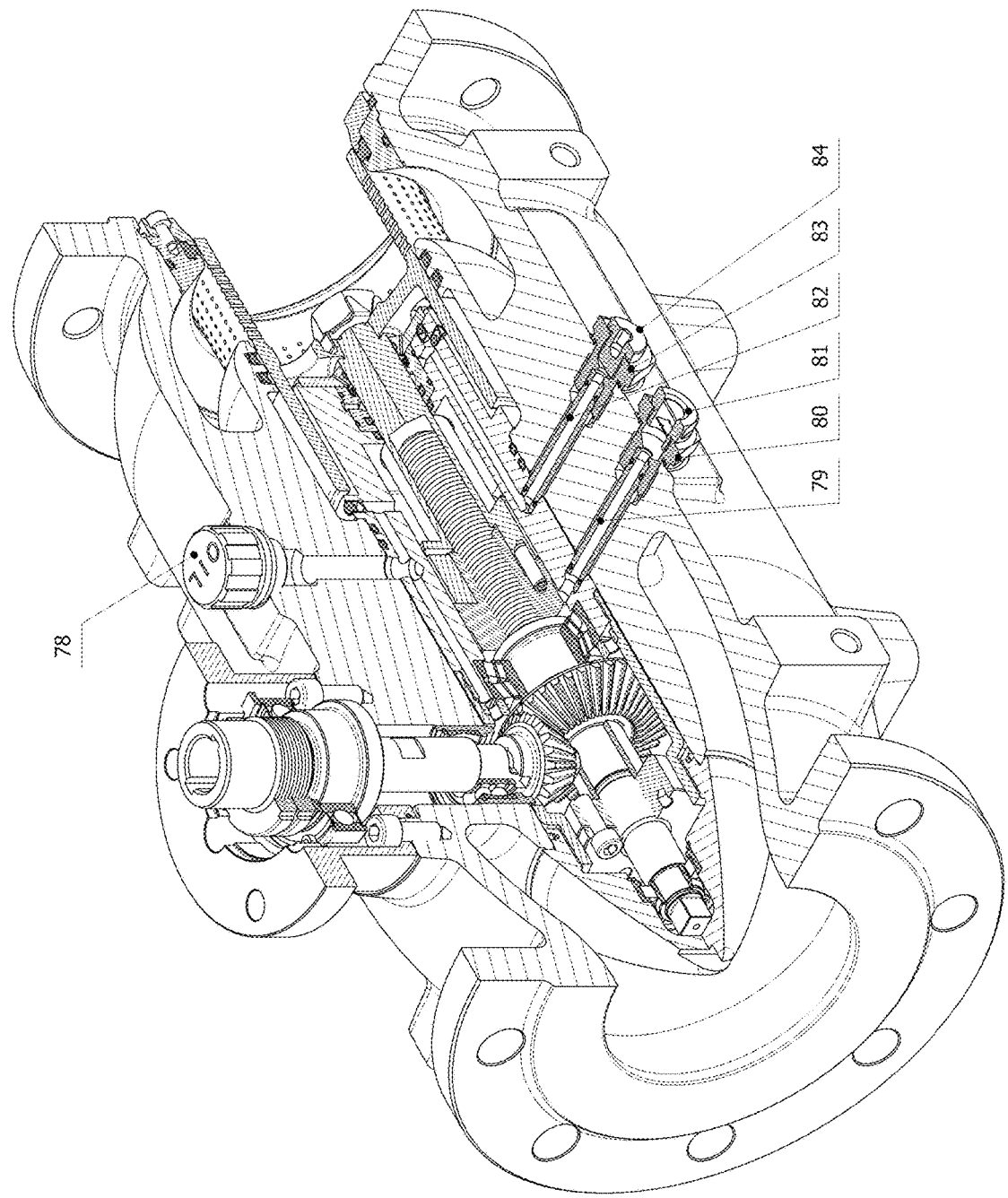
FIG. 23 shows a cross-section of an axial flow control valve with a mechanical actuator.

The mechanical drive of the actuator of the flow control valve is shown in FIGS. 22 and 23. According to the said invention, the dimensions of the outer valve body (1) are such that the valve can be smoothly installed as an element of the pipeline where the fluid flow needs to be regulated. Inside the outer valve body (1) there is the central valve body (2) connected to the outer valve body (1) by the plurality of ribs (1.1). The number of ribs is optimal with respect to the hydrodynamic resistance of fluid flow and the mechanical stresses of the valve itself. The outer valve body (1) comprises of the coaxially located inlet and outlet for fluid flow. When the valve is in a specific open position, the fluid flows around the central valve body (2) through the channel (7). The outer valve body (1) and the central valve body (2) comprise of the bore (3) radially extending through the said outer and central valve body. Components of the external sensor mechanism pass through the bore (3) or the connection between the internal sensor mechanism and the processor for analysing the signal of the position of a regulating piston (80) is established. A mechanical actuator (4-b) is located inside the central valve body (2). The tightening of the mechanical actuator (4-b) after its positioning in the central part within the central valve body (2) is performed at the front of the valve, in the area of the inlet for fluid flow, by means of a clamping cap (10-c) and a bush (12-c). For valves of larger nominal diameters, the additional fastening of the mechanical actuator (4-b) is performed by means of a clamping flange (4.1-a) as illustrated in FIG. 18 for the design of a flow control valve with hydraulic drive of the actuator. Within the central valve body (2) there is the mechanical actuator (4-b) whose main component is a horizontal screw spindle (71) which actuates the regulating piston (80) in the direction of opening or closing via the horizontal spindle nut (70). The horizontal screw spindle (71) is located inside an axial bore in an actuator piston rod (72) of the mechanical actuator (4-b). The actuation of the mechanical actuator (4-b) takes place by turning a vertical spindle (62) by means of an electric motor, hydraulic motor, pneumatic motor or by means of a handwheel. The torque is transmitted to the horizontal screw spindle (71) via a pair of bevel gears (41) and (42), whose axes mutually intersect at a right angle. The vertical spindle (62) lies within an attachment flange (69) by means of a bearing (63) and in the central part of the central valve body (2) by means of a bearing (40). The attachment flange (69) is connected to the outer valve body (1) by means of multiple screws (32) and enables the assembly of various types and sizes of said drives.

The horizontal screw spindle (71) is mounted by means of a main bearing (75) and an auxiliary bearing (73) located within the chuck of the central valve part (10-c). The main bearing (75) is located between the horizontal spindle nut (70) and the bevel gear (42). The axial tightening of an outer shell of the main bearing (75) to the mechanical actuator (4-b) is secured by means of a washer (74), and an inner shell of the main bearing (75) is secured by means of a remote bush (71.1), a nut (49.1) and the bevel gear (42). The nut (49.1) is secured from loosening by means of a security bolt (49.2).

The actuator piston rod (72) is secured and unwanted rotation of the regulating piston (80) is prevented by means of a parallel key (77) located between the part of the body of the mechanical actuator (4-b) and the horizontal spindle nut (70) to which the actuator piston rod (72) is connected. The parallel key (77) is secured to the body of the mechanical actuator (4-b) by screws (76). The horizontal spindle nut (70) has a corresponding groove on its rim where the parallel key (77) slides and thus prevents unwanted rotation of the regulating piston (80).

The sealing of the regulating piston (80) and the actuator piston rod (72) of the actuator is carried out in the same way as for the control valve with the hydraulic drive of the actuator by using the gaskets (9; 22; 24; 26) described above. A radial bore and a pipe (79) serve to control the level of oil or grease for lubricating the actuator. The regulating piston (80) is fastened to the actuator piston rod (72) of the mechanical actuator (4-b) by means of an outer nut (27). The regulating piston (80) itself is in hydrostatic balance during the regulating motion in such a way that the same pressure of the flow fluid acts on it from all sides, minimizing the actuating force of the actuator piston rod (72). The regulating piston (80) is actuated by the guides (23) of the actuator piston rod (72) and the horizontal spindle nut (70). This enables a very reliable and precise actuation of the regulating piston (80). The connection (78) shown in FIG. 23 serves to fill the mechanical actuator (4-b) with a lubricating agent, either oil or grease.

The sealing control mechanism or the protection from ingress of the external flow fluid towards the interior of the mechanical actuator (4-b) is performed by a visual check or by checking the pressure increase in a pipe (82). The presence of the flow fluid in the pipe (82) or at a connection (83) means that one or more piston rod gaskets (24) are damaged and leaking. The presence of the flow fluid can be determined visually by observation or remotely using the relevant pressure switch that will register the pressure increase in the pipe (82) and warn against gasket damage (24). The pipes (79; 82) are designed in the same way as the pipes (35; 37) for the design of the hydraulic actuator (4-a) shown in FIGS. 13, 14, 17 and 21.

In addition to the aforementioned sealing system control options, the guide (23) of the actuator piston rod (72) is located at the rear end of the outer rim of the actuator piston rod (72) and its axial movement is prevented by the clamping cap (25) and matching screws. This results in high reliability of the mechanical actuator (4-b) and flexibility in using various types of gaskets depending on the flow fluid, temperature and pressure.

1.3 Pneumo-Hydraulic Drive (PHD) of the Actuator

A pneumo-hydraulic drive (PHD) of the valve actuator is shown in FIGS. 24 to 31. According to the said invention, the dimensions of the outer valve body (1; 99) are such that the valve can be smoothly installed as an element of the pipeline where the fluid flow needs to be regulated. In the valve body which is made of two mutually connected outer valve bodies (1 and 99) there is a central valve body which is also made of two mutually connected central valve bodies (2; 100). Each of the two central valve bodies (2; 100) is connected to their corresponding outer part of the outer valve body (1; 99) by the plurality of ribs (1.1). The number of ribs is optimal with respect to the hydrodynamic resistance of fluid flow and the mechanical stresses of the valve itself. When the valve is in a specific open position, the fluid streams around the central bodies of the valve (2; 100) through the channel (7). The outer valve body (1) includes the inlet for fluid flow and the outer valve body (99) contains the outlet for fluid flow. The outer two-part valve body (1; 99) and the central valve body (2; 100) each comprise of the bore (3) radially extending through the said outer and central body. Components of the external sensor mechanism pass through the bore (3) or the connection between the internal sensor mechanism and processor for analysing the signal of the position of the regulating piston (6-a) is established.

In the part of the central valve body (2) bordering the central valve body (99) there is a pneumatic cylinder (90.1) to which compressed air is supplied by means of a bore (87) for the direction of closing and a bore (95) for the direction of opening the valve. The longitudinal fixing of the pneumatic cylinder (90.1) is carried out by means of a cap of the pneumatic actuator (96). The front (1) and rear part (99) of the outer valve body are connected to each other by screws (97; 98). A piston of the pneumatic cylinder (90; 112) is connected to the hydraulic piston rod of an actuator (86.1-*a*) by means of a segment (93) and fastened by a washer (92) and screws (94). The piston of the pneumatic cylinder (90) may be made of solid material as shown in FIG. 24, or as a rubber membrane (112) as shown in FIG. 30.

The piston of the hydraulic actuator (86-*a*) includes a piston gasket (18) so that in the event of failure of the pneumatic part of the actuator or failure of compressed air, the forced actuation of the valve can be achieved by means of a hydraulic actuator (4-*c*) by supplying the actuating fluid under pressure in the second chamber (19) for opening the valve or in the first chamber (16) for closing the valve. The separation of the pneumatic part of the actuator from the hydraulic actuator (4-*c*) on the side of the hydraulic piston rod of the actuator (86.1-*a*) is carried out via a piston rod gasket (85). The sealing of the piston rod of the actuator (86.1-*a*) between the surrounding flow fluid and the interior of the pneumatic cylinder (90.1) is carried out by means of one or more piston rod gaskets (24), and in the opposite direction by means of the inner gasket of the piston rod (22).

The tightening of the pneumo-hydraulic actuator (4-*c*;) after its positioning in the central part of the valve (2; 100) is performed by means of the clamping cap (10-*a*) and the bush (12-*a*). For valves of larger nominal diameters, the additional fastening of the actuator is performed by means of the clamping flange (4.1-*a*) as illustrated in FIG. 18.

FIG. 27 shows how the actuator piston rod (86.1-*b*) is secured, which prevents the rotation of the regulating piston (6-*a*). The rotation of the regulating piston (6-*a*) is blocked by means of the parallel key (55) for preventing rotation of the regulating piston located between the outer rim of the cap of the pneumatic actuator (96) and the inner rim of the regulating piston (6-*a*). The parallel key (55) is fastened by screws (54). The regulating piston (6-*a*) has the matching groove on its inner side where the parallel key (55) slides and thus prevents unwanted rotation of the regulating piston (6-*a*). The said blockage of the rotation of the regulating piston is carried out primarily in case of use of the EXS external sensor mechanism via the sensor screw spindle (45) as shown in FIGS. 16 to 18 or the steel wire rope (119) shown in FIGS. 19 to 21, while in case of use of contactless sensors for the INS internal sensor mechanism the blockage is not required.

In case emergency drive is required, for example, in the direction of closing ("fail to close"), a spring (91) may be installed, which will close the valve if necessary. For the direction of opening ("fail to open") a spring may also be installed which will open the valve if necessary. The emergency drive for closing or opening the valve can also be carried out using the compressed air from the additional tank. The emergency drive for closing or opening can also be carried out hydraulically by installing an adequate hydraulic accumulator.

The sealing of the regulating piston (6-*a*) in the closed position is carried out using one or more rear gaskets (26) which are located between the inner rim of the rear part of the central valve body (100) and the outer rim of the regulating piston (6-*a*), and one or more gaskets (9) located at the outlet part (8) of the valve. The sealing in the open position or in some intermediate position is not necessary because the fluid streams around the regulating piston and, as mentioned above, helps it remain in hydrostatic balance. In addition, this design feature enables the said gaskets (9; 26) to be exposed to minimal wear. It is not specifically noted here, but it is clear that the number and arrangement of gaskets (9) and (26) may be arbitrary depending on the pressure, type of flow fluid and temperature.

The sealing control is performed by visual check or by checking the pressure increase in the pipe (33) in the same manner as described above for the hydraulic actuator (not shown in figures). The sealing of the regulating piston (6-*a*) and the actuator piston rod (86.1-*a*) is carried out in the same way as for the control valve with the hydraulic drive of the actuator by using the gaskets (9; 22; 24; 26) described above.

In addition to the aforementioned sealing system control option, the axial movements of the guide of the piston rod (23) located within the cap of the pneumatic actuator (96) are prevented by means of the clamping cap (25) and matching screws. This results in high reliability of the actuator and flexibility in using various types of gaskets depending on the flow fluid, temperature and pressure.

As mentioned in the design of the valve based on the said invention, the signalization of the position of the regulating piston (6-*a*) in the regulating motion is most often carried out by means of the INTS internal sensor mechanism and EXTS external sensor mechanism.

1.4 Pneumatic Drive (PD) of the Actuator

A pneumatic drive (PD) of the valve actuator is shown in FIGS. 32 to 36. According to the said invention, the dimensions of the valve outer body (1; 99) are such that the valve can be smoothly installed as an element of the pipeline where the fluid flow needs to be regulated. In the valve body which is made of two mutually connected outer valve bodies (1 and 99) there is a central part of the valve which is also made of two mutually connected central valve bodies (2; 100). Each of the two central valve bodies (2; 100) is connected to their corresponding outer body of the valve (1; 99) by the plurality of ribs (1.1). The number of ribs is optimal with respect to the hydrodynamic resistance of fluid flow and the mechanical stresses of the valve itself. When the valve is in a specific open position, the fluid streams around the central bodies of the valve (2; 100) through a channel (7). The outer valve body (1) includes an inlet for fluid flow and the outer valve body (99) contains an outlet for fluid flow. The outer two-part valve body (1; 99) and the central valve body (2; 100) each comprise of the bore (3) radially extending through the said outer and central body. Components of the external sensor mechanism pass through the bore (3) or the connection between the internal sensor mechanism and processor for analysing the signal of the position of the regulating piston (6-*a*) is established.

In the front part of the central valve body (2) there is the pneumatic cylinder (90.1) to which compressed air is supplied by means of the bore (87) for the direction of closing and the bore (95) for the direction of opening the valve. The longitudinal fixing of the pneumatic cylinder (90.1) on the side of the regulating actuator (6-*a*) is carried out by means of a cap of the pneumatic actuator (96) of the regulating piston (6-*a*). The front part of the outer valve body (1) and the rear part of the outer valve body (99) are interconnected by screws (97; 98). The piston of the pneumatic cylinder (90.1) is connected to the actuator piston rod (86.1-*a*) by means of a segment (93) and fastened by a washer (92) and screws (94). The actuator piston (107-*a*), whose dimensions match the inner diameter of the hydraulic actuator (4-*c*) for the pneumo-hydraulic drive is attached on the other side of the said piston rod. The role of the actuator piston (107-*a*) is to actuate the piston rod of the actuator (86.1-*a*) and the regulating piston (6-*a*) since the hydraulic oil is not supplied to the actuator under pressure.

The sealing of the piston rod inside the pneumatic part is carried out by means of piston rod gaskets (85; 85.1). The sealing of the piston rod of the actuator (86.1-*a*) between the surrounding flow fluid and the interior of the pneumatic cylinder (90.1) is carried out by means of one or more piston rod gaskets (24), and in the pneumatic part by means of the inner piston rod gasket (22). The piston rod gasket (24) is located between the guide (23) and the piston rod of the actuator (86.1.-*a*). The piston rod gasket (24) is located within the circular groove of the guide (23) located at the rear of the guide (23). The inner piston rod gasket (22) is located on the rim of the actuator piston rod (86.1-*a*) between the pneumatic actuator cap (96) and the guide (23).

The tightening of the actuator (4-*c*) after its positioning in the central valve part body (2) is performed by means of the clamping cap (10-*a*) of the central part of the valve and the bush (12-*a*). For valves of larger nominal diameters, the additional fastening of the actuator is performed by means of the clamping flange (4.1-*a*) as illustrated in FIG. 18. FIG. 35 shows how the piston rod (86.1-*b*) of the actuator is secured and how the rotation of the regulating piston (6-*a*) is prevented by means of the parallel key (55) located between the outer rim of the cap of the pneumatic actuator (96) and the inner rim of the regulating piston (6-*a*). The parallel key (55) is fastened by screws (54). The regulating piston (6-*a*) has the matching groove on its inner side where the parallel key (55) slides and thus prevents unwanted rotation of the regulating piston (6-*a*). The said blockage of the rotation of the regulating piston is carried out primarily in case of use of the EXS external sensor mechanism via the sensor screw spindle (45) shown in FIGS. 16 and 17 or the steel wire rope (119) shown in FIGS. 19 to 21, while in case of use of contactless sensors for the INS internal sensor mechanism the blockage is not required.

In case emergency drive is required, for example, in the direction of closing ("fail to close"), the spring (91) may be installed, which will close the valve if necessary. For the direction of opening ("fail to open") a spring may also be installed which will open the valve if necessary. The emergency drive for closing or opening the valve can also be carried out using the compressed air from the additional tank.

The sealing of the regulating piston (6-*a*) in the closed position is carried out using one or more rear gaskets (26) which are located in the other central valve body (100) and the gasket (9) located at the outlet part (8) of the valve. The rear gaskets (26) are located between the inner rim of the rear valve body (100) and the outer rim of the regulating piston (6-*a*). The sealing in the open position or in some intermediate position is not necessary because the fluid streams around the regulating piston and, as mentioned above, helps it remain in balance. In addition, this constructive feature enables the said gaskets (9; 26) to be exposed to minimal wear. It is not specifically noted here, but it is clear that the number and arrangement of gaskets (9) and (26) may be arbitrary depending on the pressure, type of flow fluid and temperature.

The sealing of the regulating piston (6-*a*) and the piston rod of the actuator (86.1-*a*) is carried out in the same way as for the control valve with the hydraulic drive of the actuator by using the gaskets (9; 22; 24; 26) described above. The sealing control is performed by visual check or by checking the pressure increase in the pipe (33) in the same manner as described above for the hydraulic actuator (not shown in figures).

In addition to the aforementioned sealing system control option, the axial movements of the guide of the piston rod (23) located within the cap of the pneumatic actuator (96) are prevented by means of the clamping cap (25) and matching screws. This results in high reliability of the actuator and flexibility in using various types of gaskets depending on the flow fluid, temperature and pressure.

2. Check Valves (CV)

According to the said invention, for the purposes of controlled opening and closing and preventing the disc to strike the body of the check valve, i.e. the outlet allowance of the valve, the following solutions are used.

Figure 37:
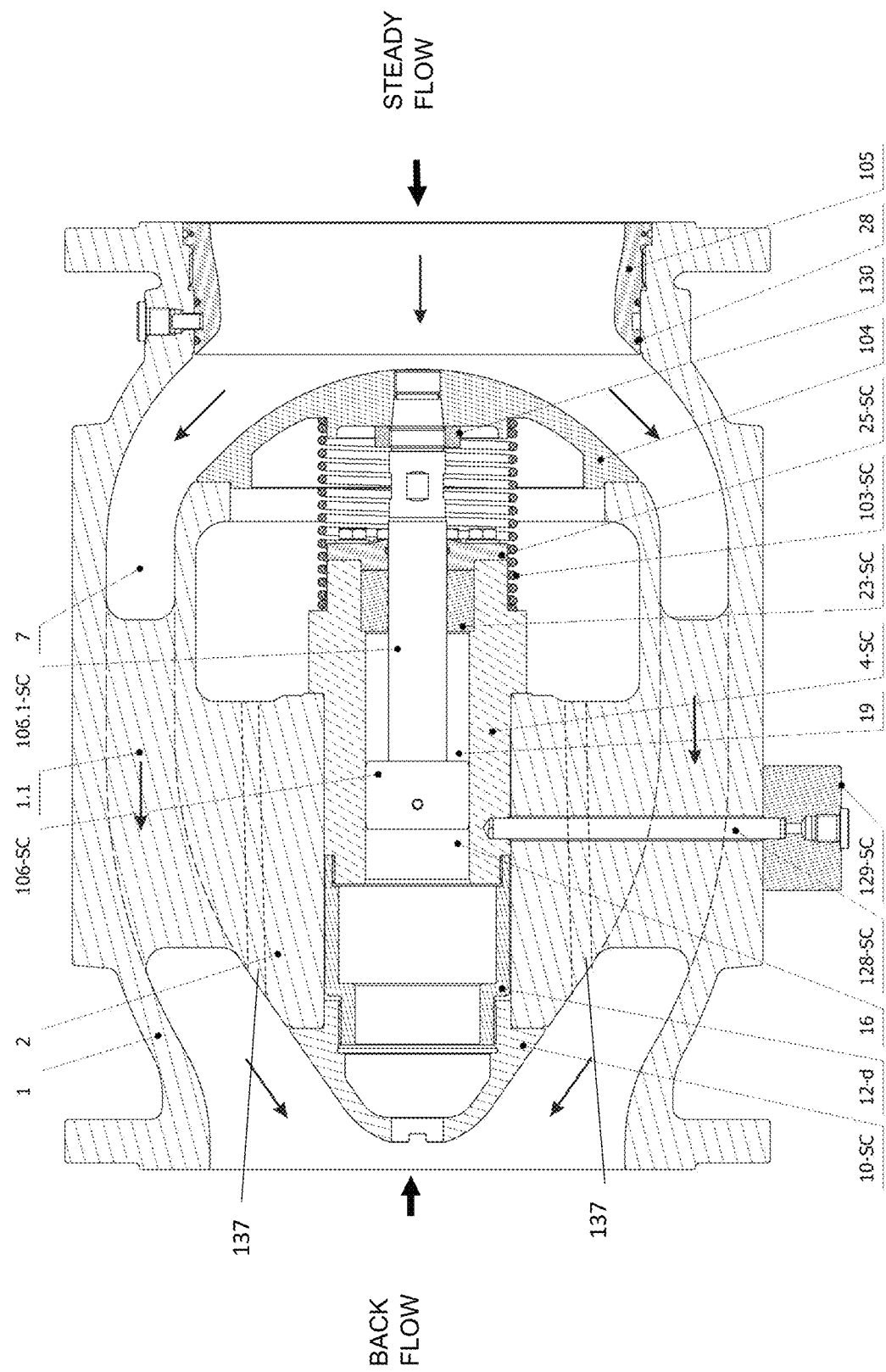
FIGS. 37 to 39 show different designs of a check valves with regard to a type of drive, from those controlled solely by flow fluid to more advanced designs.
Figure 38:
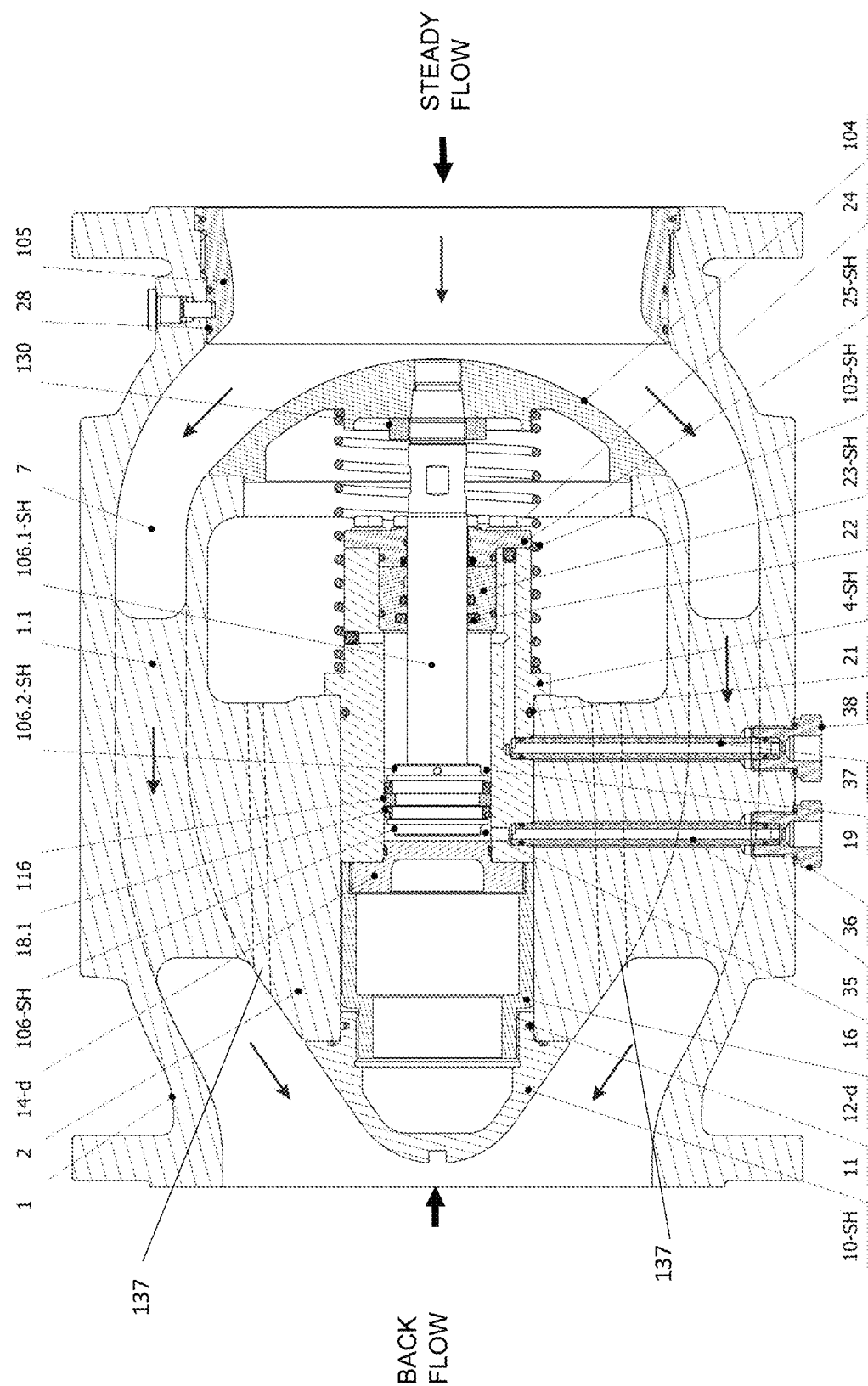
Figure 39:
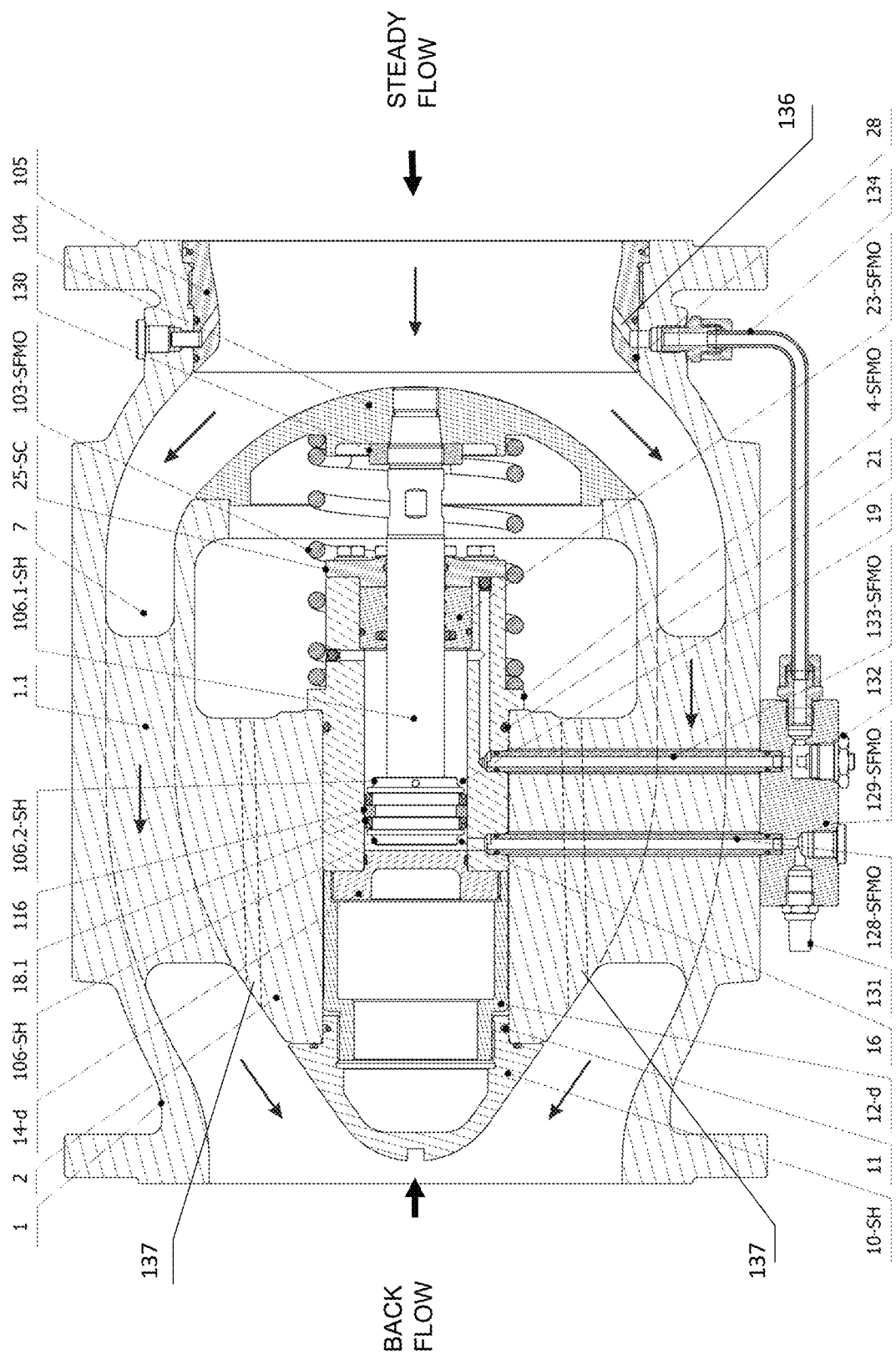

FIGS. 37 to 39 show check valves with different actuator designs. According to the said invention, the dimensions of the outer valve body (1) are such that the valve can be smoothly installed as an element of the pipeline. Inside the outer valve body (1) there is a central valve body (2) connected to the outer valve body (1) by the plurality of ribs (1.1). The outer valve body (1) comprises of the coaxially located inlet and outlet for fluid flow. The number of ribs (1.1) is optimal with respect to the hydrodynamic resistance of fluid flow and the mechanical stresses of the valve itself. When the valve is in a specific open position, the fluid flows around the central valve body (2) through the channel (7). The actuator (4-SC; 4-SH; 4-SFMO) is positioned axially inside the central valve body (2). The tightening of the actuator (4-SC; 4-SH; 4-SFMO) after its positioning in the central part within the central valve body (2) is performed at the outlet for fluid flow by means of the clamping cap (10-SC; 10-SH) and the bush (12-*d*). On the opposite part of the valve, the tightening of the actuator (4-SC; 4-SH; 4-SFMO) is performed by means of the clamping cap (25-SC; 25-SH;) and matching screws. Some designs of the actuator piston (106-SC; 106-SH;) may include a piston gasket which is used for sealing between the said piston and the inner body of actuator (106-SC; 106-SH). The actuator piston (106-SC; 106-SH) is connected to the disc (104) through the actuator piston rod (106.1-SC; 106.1-SH). The piston (106-SC; 106-SH) is actuated by the piston rod of the actuator (106.1-SC; 106.1-SH). On an outer rim in an area above the guide (23-SC; 23-SH; 23-SFMO) the actuator (SC-4; 4-SH; 4-SFMO) has a radial annular projection which one end of a spring (103-SC; 103-SH; 103-SFMO) rests on, while the other end of the said spring rests on a bottom of the disc (104), the bottom has an annular projection on the inside extending in the axial direction towards an interior of the actuator (4-SC; 4-SH; 4-SFMO) and around which the spring (103-SC; -SH; 103-SFMO) is positioned. The disc (104) is secured to the actuator piston rod (106.1-SC; 106.1-SH) by means of a disc clamping nut (130). On one end of the piston (106-SC; 106-SH) there is the first chamber (16) for closing the valve, and on the other end of the piston (106-SC; 106-SH) there is the second chamber (19) for opening the valve. On the valve inlet there is a seating ring (105) located on an inner rim of the outer valve body (1). Between the seating ring (105) and the inner rim of the valve body (1) there is a seating ring gasket (28). The axial movements of the guide (23-SC; 23-SH; 23-SFMO) of the piston rod of the actuator (106.1-SC; 106.1-SH) located at the rear part of the outer rim of the said piston rod of the actuator are prevented by means of the clamping cap (25-SC;) and matching screws. The single-part outer valve body (1) and the central valve body (2) comprise of the bore (3) radially extending through the said outer and central body. Components of the external sensor mechanism pass through the bore (3) or the connection between the internal sensor mechanism and processor for analysing the signal of the position of the disc (104) is established.

FIG. 37 shows a regular check valve with actuator drive using a flow fluid whose operation is completely autonomous and based solely on the energy of the flow fluid, which can be water, oil, gas, compressed air, cryogenic and high temperature fluids. The flow fluid in reverse flow in the opposite direction ("constant flow" in the figure) from the direction of the fluid flow in the pipeline, due to dynamic pressure, enters the first chamber (16) through a bore (135) in the clamping cap (10-SC), pushing the piston (106-SC) and thus the disc (104) to close the valve. In this design of the check valve, the first chamber (16) and the second chamber (19) are interconnected by channels. The actuator (1) is fixed in the valve body by means of the actuator centering bar (128-SC). The opening is performed automatically when the pump starts running due to the dynamic pressure of the flow fluid on the disc (104) of the check valve, and closing is performed automatically with the initial action of the spring (103-SC) and the reverse flow in the event of pump failure. In case of purer flow fluids, adequate throttle check valves may be fitted that can affect the opening or closing speed. Since the opening of the valve is performed solely by the action of the dynamic pressure on the disc (104), weaker springs (103-SC) are installed in this type of valve to fully open the valve, especially in case of low flow rates.

FIG. 38 shows a regular check valve that can use the hydraulic or the pneumatic actuator regulating the opening or closing speed and actuating the disc used in case of impure flow fluids. The hydraulic or pneumatic piston (106-SH) is operated by the guide (23-SH) and the actuator piston rod (106.1-SH). The sealing of the actuator (4-SH) between the surrounding flow fluid and its interior is performed by one or more gaskets (24; 22). The piston rod gasket (24) is located around the rim of the actuator piston rod (106.1-SH) between the guide (23-SH) and the clamping cap (25-SH), and the inner gasket (22) is located around the rim of the guide (23-SH) and mounted on the inner part of the actuator (4-SH). The actuating fluid for the direction of valve closing is supplied through the channel (35), and the actuating fluid for the direction of valve opening is supplied through the channel (37). Channels (35; 37) are of the same design as the channels described for the flow control valves (see FIG. 14). This type of valve may contain an internal sensor mechanism, i.e. in the form of the linear position sensor shown in FIG. 12, or the external sensor mechanism in the form of the limit switch located on the handle on the outside of the valve body. With this type of valve, the operation is completely the same as with the previous one, except that with this type, there is a compressible or non-compressible fluid in the actuator (4-SH). This ensures reliable operation of the check valve and necessary adjustment of opening and closing times, regardless of the degree of impurity of the flow fluid or the presence of solid particles.

The opening direction is achieved by direct operation of the dynamic pressure of the flow fluid on the disc (104) when the pump starts. The direction of valve closing is achieved by a combined action of the reverse flow of the flow fluid through longitudinal channels or bores (137) passing through the central valve body (2) to a cylinder hole located between a part of the central valve body (2) and the actuator (4-SH) and the spring (103-SH) or a hydraulic accumulator for larger check valves. The solution consists of an additional tank with a compressible or non-compressible fluid and a throttle check valves for adjusting the opening and/or closing speed via the actuator (4-SH) to prevent the disc to strike the seating ring (105) when closing.

FIG. 39 shows an advanced design of the check valves with the actuator being driven by a flow fluid. The hydraulic or pneumatic piston (106-SH) is operated by the guide (23-SFMO) and the actuator piston rod (106.1-SH). The sealing of the actuator (4-SFMO) between the surrounding flow fluid and its interior is performed by one or more gaskets (24; 22). The piston rod gasket (24) is located around the rim of the piston rod (106.1-SH) of the actuator between the guide (23-SFMO) and the clamping cap (25-SC), and the inner gasket (22) is located around the rim of the guide (23-SFMO) and mounted on the inner part of the actuator (4-SFMO). For valve closure via a pipe (128-SFMO), the "A" side of the actuator, i.e. the first chamber (16) is vented at a vent filter (131), and the actuating fluid for the direction of valve opening is supplied through a channel (133-SFMO) to the "B" side of the actuator, i.e. supplied to the second chamber (19) via an actuation pipe (134) connected to a channels (136) located around the rim of the seating ring (105).

In case of advanced solutions of check valves, the dynamic pressure of the flow fluid acts during opening directly on the disc (104) of the check valve, plus the static pressure component acting on the differential "B" side (19) of the actuator piston, so that their joint action fully opens the valve, even with very strong springs (103-SFMO) and at very low flow rates. This means that advanced check valve solutions completely eliminate the flow losses or financial losses incurred as a result of spring or hydraulic accumulator operation from the previous item. In addition, they provide a much better and more reliable protection of the check valve because a far stronger spring type CV.SC.FMFO or, in case of the design with the hydraulic accumulator, type CV.AC.FMFO can be installed, where the hydraulic oil pressure acts in the actuator instead of the spring. In addition, in case of using check valves with impure flow fluids and obtaining a flexible feature of check valves type CV.EXPO, in the actuator on the piston "A" side and differential "B" side, an actuating fluid from external sources can be supplied, e.g. compressed air. In that case, valve closing is performed by a combined action of reverse flow of the flow fluid through longitudinal channels (137) passing through the central valve body (2) to the cylinder hole located between a part of the central valve body (2) and the actuator (4-SFMO) and spring (103-SFMO) or a hydraulic accumulator for larger check valves.

This design allows for the external actuating fluid to be supplied through the supply pipe (35) in case greater closing forces are required for better sealing in the closed position.

3. Sensors and Feedback Control

As mentioned in the design of the valve based on the present invention, the signalization of the position of the regulating piston (6-*a*; 80) or the disc of check valves (104) in the regulating motion is carried out by installing a sensor within the valve itself, the so-called INTS internal sensor mechanism or the motion of the regulating piston is transferred by an adequate mechanism to the sensors installed outside the valve, the so-called EXTS external sensor mechanism. A detailed description of the internal and external sensor mechanism applicable to all types of above mentioned valve drives is given below. Examples of design for all types of sensor mechanisms applicable to all types of drives according to the present invention are illustrated in FIGS. 12, 15, 16, 18, 19 and 20 showing the flow control valve with the hydraulic drive of the actuator.

3.1 Internal sensor mechanism type INTS, developed in the form of the linear position sensor, is shown in FIGS. 12 and 13 for the flow control valve with the hydraulic drive of the actuator, FIGS. 24 and 25 for the flow control valve with the pneumo-hydraulic drive of the actuator, and FIGS. 32 and 33 for the flow control valve with the pneumatic drive of the actuator. A linear position sensor can also be installed in a regular check valve that can use a hydraulic or pneumatic actuator. The linear position sensor consists essentially of two parts, an electronic head of the sensor (13) with a corresponding magnet (17) and an ultrasonic probe (20) in the form of a bar positioned within the axial bore in the actuator piston rod (5.1-*a*; 86.1-*a*) of the actuator (4-*a*; 4-*c*). The linear position sensor is placed centrally in the actuator (4-*a*, 4*c*). There are many types of electronic linear position sensors, and the most frequently used magnetostrictive linear position sensor is shown in FIG. 12. The principle of using a linear position sensor in the state of the art is known under the term of magnetostriction. Simply put, the process of measuring the position is initiated by short electric impulses in the electronic head of the position sensor (13) by generating electromagnetic waves transmitted longitudinally via an ultrasonic probe (20) until they reach the reference position, which is most often a permanent magnet (17). Namely, an interaction of magnetic fields, which is very accurately read in the electronic head of the position sensor (13) occurs at the position of the actuator piston (5-*a*, 86-*a*, 107-*a*) on which the permanent magnet (17) is installed. The difference between the transmission and reception time, i.e. reading of the wave disturbance, indirectly points to the distance or position of the actuator piston (5-*a*, 86-*a*, 107-*a*). Such linear position sensors are extremely reliable components and are commercially available. The time response, i.e. distance, can be converted into a linear electrical value in the electronic head of the position sensor itself (13) and as an easily measurable electrical signal value (e.g. voltage or modulated current signal) can be conducted by wires through the bore (3) and wire rope feed (31) to the processor for the analysis of the said signal.

3.2 External Sensor Mechanism, Type EXTS

The external sensor mechanism, type EXTS according to the present invention, where the movement of the regulating piston (6-*a*) to the sensors located on the outside of the valve is achieved by a special mechanism of different designs, as described below.

3.2.1 External sensor mechanism with a Fix Spindle—EXTS.FS is shown in FIG. 18. The external sensor mechanism with the fix spindle consists of the horizontal sensor screw spindle (45) connected to a nut (51), a horizontal bevel gear spindle (50.1) on which the bevel gear (42) is attached and a vertical sensor shaft (62.1) on which a bevel gear (41) is attached, whereby the horizontal bevel gear spindle (50.1) and the vertical sensor shaft (62.1) are mutually connected by bevel gears (41; 42), whose horizontal sensor screw spindle (45) is connected by means of a nut (124) to the horizontal bevel gear spindle (50.1), the nut (51) is fixed to the actuator piston (5-*c*) by screws (52.1), where the axial movement of the actuator piston (5-*c*) and the nut (51) is transmitted to the rotational movement of the sensor screw spindle (45) and thus the horizontal bevel gear spindle (50.1), the rotational movement of which is transmitted via a pair of bevel gears (42, 41) to the vertical sensor shaft (62.1).

The sensor screw spindle (45) is fixed to the bevel gear spindle (50.1) by the nut (51). The nut (51) is attached to the actuator piston (5-*a*; 86-*a*; 107-*a*), whose axial movement is transmitted to the rotational movement of the sensor screw spindle (45), which is connected by screws to the shaft with the bevel gear (41), which transfers the rotation to the vertical sensor shaft (62.1). The sensor screw spindle (45) is located within the axial bore in the piston rod (5.1-*c*) of the actuator (4-*a*; 4-*b*; 4-*c*).

As shown in FIG. 18, the nut (51) is attached to the actuator piston (5-*c*) by screws (52.1). The axial movement of the nut (51) is transmitted to the rotational movement of the sensor screw spindle (45), which is connected by screws to the shaft with the bevel gear (42), which transfers the rotation to the vertical sensor shaft (62.1) by means of the bevel gear (41). The horizontal bevel gear spindle (50.1) is mounted at the bottom of the actuator with an appropriate bearing (44) and on the other side of the bearing (48) located in the actuator clamping cap (10-*a*). The bearing (44) is fixed by means of a washer (43) in the actuator body. The vertical sensor shaft (62.1) is in the central valve body (2) mounted via the bearing (40) located in a special bush (39). The upper part of the vertical sensor shaft (62.1) is mounted by means of a bearing (63) located in the bush (56) secured to the outer valve body (1) (see FIG. 15). The vertical sensor shaft (62.1) located within the bore (3) extending from the clamping bush (12-*b*) along the central valve body (2) and the outer valve body (1) to the actuator sensor element (59.3) whose vertical sensor shaft (62.1) is axially connected to a vertical screw spindle (62.2) on which a nut is located (59.2).

Rotation of the vertical sensor shaft (62.1) is transmitted through the vertical screw spindle (62.2) to the translation of the nut (59.2) on which an indexes (59.1) are located, and they serve for the prevention of the rotation of the screw nut (51) and activation of a limit switches (64.1; 64.2) of an inductive or mechanical type, of the regulating piston (6-*a*), i.e. they are used for additional signalling of the open or closed valve position.

This design of the external sensor mechanism with the fixed spindle is mainly used for valves with a higher working stroke of the regulating piston, therefore for larger nominal valve diameters, and the sensor spindle is in contact with the actuating fluid.

Figure 15:
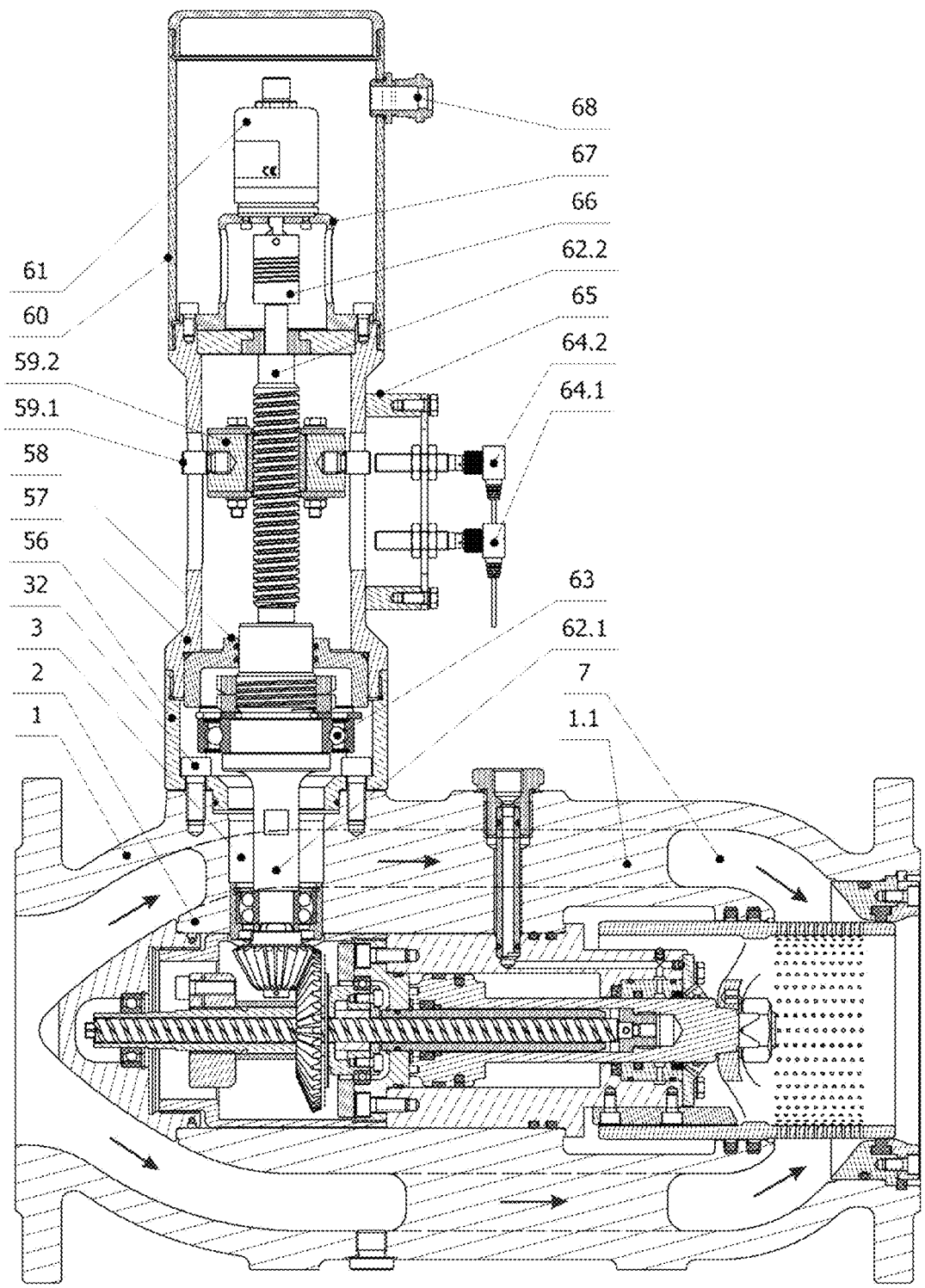
Figure 34:
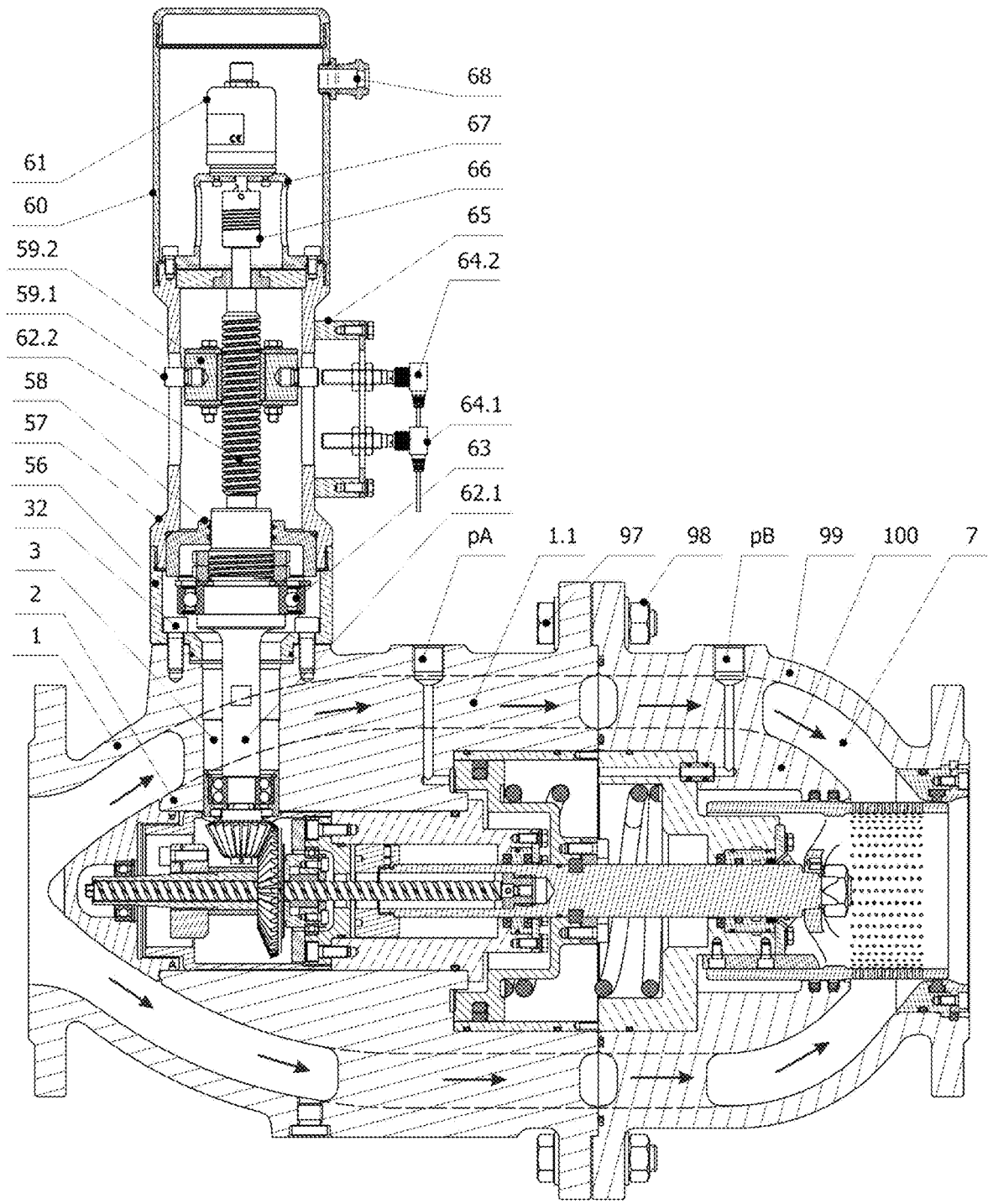

3.2.2 External Sensorics with Moving Spindle—EXTS.MS—consists of a sensor screw spindle (45) fixed to the actuator piston rod (5.1 *b*; 86.1-*b*) which is fixed in the regulating piston (6-*a*) and a nut (51), all shown in FIGS. 15 to 17 for the control valve with a hydraulic actuator, in FIGS. 26 to 31 for the control valve with a pneumo-hydraulic actuator and FIGS. 34 to 36 for a regulating valve with a pneumatic actuator.

External Sensorics with Moving Spindle consists of a horizontal sensor screw spindle (45), the horizontal bevel gear spindle (50.1) with an attached bevel gear (42) and a vertical sensor shaft (62.1) with an attached bevel gear (41), with the horizontal bevel gear spindle (50.1) and vertical sensor shaft (62.1) connected by gears via the bevel gears (41; 42) whose horizontal sensor screw spindle (45) is, via clamping nut (47), fixed within the actuator piston rod (5.1-*a*; 5.1-*b*; 5.1-*c*; 86.1-*b*), where the axial movement of the actuator piston rod (5.1-*a*; 5.1-*b*; 5.1-*c*; 86.1-*b*) and thus the horizontal screw spindle (45) fixed on the horizontal bevel gear spindle (50.1) via nut (51) is transmitted to the rotational movement of the stated above which is transmitted via a pair of bevel gears (42, 41) to the vertical sensor shaft (62.1).

As shown in the aforementioned figures, the sensor screw spindle (45) is fixed via clamping nut (47) within the actuator piston rod (5.1-*b*; 86.1-*b*), and this spindle transmits the axial movement of the piston (5-*a*; 5-*b*; 86.1-*a*;107-*b*) to the rotational movement via a nut (51) located on the sensor screw spindle (45). By means of the sensor screw spindle (45) and a pair of bevel gears (42, 41) the rotation is transferred to the vertical sensor shaft (62.1). The sensor screw spindle (45) is insulated from the high hydraulic control pressure by means of a pipe (46) fixed at the bottom of the actuator (14-*b*) and a seal (53) located in the piston itself (5-*b*). The sensor screw spindle (45) is mounted at the bottom of the actuator (14-*b*) via the appropriate bearing (44), on the other side of the bearing (48) located in the clamping head of central valve body (10-*b*). The bearing (44) is fixed by means of a washer (43) in the actuator body. The vertical sensor shaft (62.1) lies in the central valve body (2) mounted via a bearing (40) located in a special bush (39). The upper part of the said vertical sensor shaft is secured to the outer valve body (1) by means of a bearing (63) located in the bush (56). The vertical sensor shaft (62.1) located within the bore (3) extending from the clamping bush (12-*b*) along the central valve body (2) and the outer valve body (1) to the actuator sensor element (59.3) whose vertical sensor shaft (62.1) is axially connected to the vertical screw spindle (62.2) on which a nut is located (59.2).

Rotation of the vertical sensor shaft (62.1) is transmitted through the vertical screw spindle (62.2) to the translation of the nut (59.2) on which the indexes (59.1) are located, and they serve for the prevention of the rotation of the screw nut (59.2) and activation of the limit switches (64.1; 64.2) of an inductive or mechanical type, of the control piston (6-*a*), i.e. they are used for additional signalling of the open or closed valve position.

This type of external sensor mechanism with a swivel spindle is mainly used for valves with a lower working stroke, therefore for smaller nominal valve sizes, and the sensor spindle is not in contact with the actuating fluid via the insulating pipe (46).

3.2.3. External Sensor Mechanism with Steel Wire Rope—EXTS.SC—consists of the steel wire rope (119) and an appropriate tackle (118), shown in FIGS. 19 to 21 for a control valve with the hydraulic actuator, but the same can also be applied to control valves with other types of drives.

One end of the steel wire rope (119) is fixed to the piston rod (5.1-*c*) and the other one in the special actuator sensor element (59.3) located in the holder (57) of the external sensor mechanism attached to the valve body from the outside. The required yaw of the steel wire rope is performed by means of the special tackle (118) fixed on a special flange of the actuator bottom (14-*c*). Tracking of movement of the regulating piston (59.3) of the external sensors is realized by means of the steel wire rope (119), and a spring (121) always holds the steel wire rope (119) with the required tensile force.

The steel wire rope (119) is insulated from the actuating fluid via the insulating piston rod (46) fixed within the flange of the actuator bottom (14-*c*). Different types of linear position sensors and limit switches can be fixed to the sensor holder (57) of the external sensor mechanism as means of signalling the position of the regulating piston (6.1-*a*). If the stroke of the actuating sensor element (59.3) is too large for vertical mounting, by installing another tackle of the steel wire rope, the sensor holder can be rotated by 90°, i.e. placed in the horizontal longitudinal position, thus resulting in design compactness.

The same sensors can be used on all designs of external sensor mechanisms, as shown in FIG. 15. The shown sensors are located on the holder (57) of the external sensor mechanism and may be in the form of the limit switches (64.1; 64.2) or rotary (61) or linear position sensors (13) of the same type as shown in FIG. 12.

External sensor mechanism EXT is used, for example, in the application of valves with flow fluids of high temperature, such as hot water vapor flow or additional signalling of the end positions of the regulating piston (6-*a*) via the limit switches (64.1; 64.2) of various types is required.

INDUSTRIAL APPLICABILITY

The industrial applicability of this invention is apparent, it is a new modular design axial valve with a wide area of applications in controlling the flow of various fluids.

REFERENCE SIGNS 1 outer valve body
1.1 ribs
2 central valve body
3 steel wire ropes opening bore
4.1-*a* front clamping actuator flange
4-*a* actuator body
4-*b* actuator body
4-*c* actuator body
4-SC actuator body
4-SFMO actuator body
4-SH actuator body
5-*a* actuator piston
5-*b* actuator piston
5-*c* actuator piston
5.1-*a* actuator piston rod
5.1-*b* actuator piston rod
5.1-*c* actuator piston rod
6-*a* regulating piston
6.4-*a* holder of the segment preventing rotation of the regulating piston
6.5-*a* segment preventing rotation of the regulating piston
7 streaming area of the flow medium
8 outlet section
9 gasket of the outlet section
10-*a* clamping cap of the central valve part
10-*b* clamping cap of the central valve part
10-*c* clamping cap of the central valve part
10-SC clamping cap of the central valve part
10-SH clamping cap of the central valve part
11 gasket of the clamping cap
12-*a* clamping bush
12-*b* clamping bush
12-*c* clamping bush
12-*d* clamping bush
13 electronic head of the linear position sensor
14-*a* bottom of the actuator
14-*b* bottom of the actuator
14-*c* bottom of the actuator
15 clamping screws of the bottom of the actuator
16 the supply chamber of the actuating fluid for the closing direction of the valve
17 linear position sensor magnet
18 piston gasket
19 the supply area of the actuating fluid for the opening direction of the valve
20 ultrasonic probe
21 valve body gasket
22 piston rod inner gasket
23 piston rod guide
23.SC piston rod guide
23.SFMO piston rod guide
23.SH piston rod guide,
24 piston rod gasket 25 piston rod guide clamping cap
25-SC piston rod guide clamping cap
25-SH piston rod guide clamping cap
26 rear gasket
27 regulating piston outer nut
28 seating ring gasket
29 outlet part fastening bolts
30 cap
31 wire rope feed of the position sensor
32 cap fastening bolts
33 pipe of the leakage medium of the sealing system
34 cap of the tube of the leakage medium of the sealing system
35 the supply pipe of the actuating medium for the closing direction of the valve
35.1 end pipe gaskets
36 pipe cap
36.1 pipe cap gasket
37 the supply pipe of the actuating medium for the opening direction of the valve
38 cap of the tube of the actuating medium for the opening direction of the valve
40 vertical sensor spindle bearing
41 vertical sensor spindle bevel gear
42 horizontal sensor spindle bevel gear
43 flange for fastening of the outer shell of the front bearing
43.1 tackle holder flange
44 sensor spindle main bearing
45 horizontal sensor screw spindle
46 insulating piston rod
47 sensor spindle attachment nut
48 sensor spindle auxiliary bearing
49.1 nut for fastening the horizontal bevel gear
49.2 nut fixing screw
50.1 bevel gear spindle
50.2 distance bush
51 screw nut
54 parallel key fastening screws
55 parallel key for preventing the rotation of the regulating piston
56 attachment bush
57 holder of the external sensor mechanism
58 sealing cap
59.1 index/locking handle
59.2 vertical sensor spindle nut
59.3 sensor actuating element
60 cap of the rotation sensor for the position of regulating piston
61 rotary or linear position sensor
62 mechanical drive vertical shaft
62.1 vertical sensor shaft
62.2 vertical screw spindle
63 vertical shaft bearing
64.1 limit switch of the closed position of the regulating piston
64.2 limit switch of the open position of the regulating piston
65 distance of the attachment washer limit switches
66 coupling of the vertical sensor spindle and the rotating position sensor
67 mount of the rotation or the linear position sensor of the regulating piston
68 cable feed of the rotation or the linear position sensor of the regulating piston
69 attachment bush of the outer mechanical actuator
70 Horizontal spindle nut
71 Horizontal screw spindle
72 actuator piston rod
73 horizontal spindle auxiliary bearing
74 horizontally mounted clamping washer
75 horizontal screw spindle bearing
76 parallel key screw preventing the rotation of the regulating piston
77 parallel key for preventing the rotation of the regulating piston
78 cap for filling the actuator with either oil or grease for the lubrication of the drive mechanism.
79 pipe for the control of the level of oil lubricating the actuator
80 regulating piston
80 cap of the pipe for the control of the level of oil lubricating the actuator.
81 cap with a glass inspection pain for the control of oil lubricating the actuator
82 pipe of the leakage medium of the sealing system
83 clamping cap of the tube of the leakage medium of the sealing system
84 armoured cap of the tube of the leakage medium
85 piston rod gasket
85.1 piston rod gasket
86-*a* actuator piston
86.1-*a* actuator piston rod
87 bore for the closing direction of the valve
95 bore for the opening direction of the valve
96 pneumatic actuator cap
97 binding screw
98 screw nut
99 outlet valve body
100 central part of the outlet valve body
101 the supply of compressed air (control media) for the closing direction of the valve
102 the supply of compressed air (control media) for the opening direction of the valve
103-SC spring
103-SFMO spring
103-SH spring
104 disc
105 seating ring
106.1-SH actuator piston rod
106-SH actuator piston
107-*a* actuator piston
107-*b* actuator piston
116 piston guide
118 wire rope tackle
119 steel wire rope
120 vertical external insulating piston rod of the steel wire rope
121 spring
124 sensor screw spindle clamping nut
125 rotation gasket
126 sensor screw spindle clamping flange
128-SC actuator centering bar in the valve body
128-SFMO pipe of the piston "A" side of the actuator
130 disc clamping nut
131 vent outlet-inlet filter
132 throttle cap
133-SFMO pipe of the differential "B" side of the actuator
134 actuator pipe
136 seating ring channels
137 central valve body longitudinal channels
pA supply of the control medium for the closing direction
pB supply of the control medium for the opening direction

The invention claimed is:

1. A modular axial flow control valve comprising:
a single-part or two-part outer valve body, the outer valve body comprises a coaxially situated inlet and outlet opening for fluid flow;
a central valve body connected to the outer valve body by means of ribs, wherein channels are situated between the outer valve body and the central valve body, said channels allow for an undisturbed flow of the flow fluid when said axial valve is open;
a drive of an actuator located axially within the central valve body, the actuator containing an actuator piston and an actuator piston rod to which a regulating piston is connected;
radial bores extending from the outer valve body containing pipes through which a pressurized control fluid flows to the actuator piston;
a sealing system enabling protection from the ingress of an outer flow fluid towards an interior of the actuator and a sealing control of the actuator and of the actuator piston rod;
an external sensor mechanism for actuating the regulating piston in a direction of opening or closing the axial valve, or for signalling a position of the regulating piston through a mechanism to sensors installed outside the axial valve;
a bore radially extending through said outer and said central body, wherein components of the external sensor mechanism pass through the bore;
wherein the external sensor mechanism comprises:
a horizontal sensor screw spindle or a steel wire rope for signalling the position of the regulating piston; or
a horizontal screw spindle for actuating the regulating piston,
wherein the horizontal sensor screw spindle, horizontal screw spindle, or the steel wire rope is being fixedly housed inside an axial bore in the actuator piston rod, wherein the horizontal sensor screw spindle or the steel wire rope is being insulated from a control fluid by means of an insulating piston rod and a seal located in the actuator piston rod, the insulating piston rod is being fixed to a bottom of the actuator;
wherein a rotation of the regulating piston is blocked by means of a parallel key located on a rear outer rim of an actuator body and attached to the actuator body, the regulating piston has a matching groove on its inner side where the parallel key slides and thus prevents unwanted rotation of the regulating piston.

2. The axial valve according to claim 1, wherein the horizontal sensor screw spindle is a fix horizontal sensor screw spindle coupled to a screw nut, being connected to the actuator piston, a horizontal bevel gear spindle on which a first bevel gear is attached and a vertical sensor shaft on which a second bevel gear is attached, wherein the horizontal bevel gear spindle and the vertical sensor shaft are connected by the bevel gears, where the axial movement of the actuator piston and the screw nut is transmitted to a rotational movement of the fix horizontal sensor screw spindle and thus the horizontal bevel gear spindle, the rotational movement of which is transmitted via the first and second bevel gears to the vertical sensor shaft and to sensors installed outside the axial valve.

3. The axial valve according to claim 2, wherein sensors installed outside the axial valve comprise an actuating sensor element having indexes which serve for activation of limit switches of the regulating piston and for signalling the open or closed position of the valve, the limit switches being either of an inductive or mechanical type.

4. The axial valve according to claim 1, wherein the horizontal sensor screw spindle is a moving horizontal sensor screw spindle coupled to a horizontal bevel gear spindle with a first attached bevel gear and to a vertical sensor shaft with a second attached bevel gear, where the horizontal bevel gear spindle and the vertical sensor shaft are connected by the bevel gears, the horizontal sensor screw spindle being fixed within the actuator piston rod, wherein the axial movement of the actuator piston rod and of the moving horizontal sensor screw spindle is, via the screw nut fixed on the horizontal bevel gear spindle, transmitted to rotational movement which is transmitted via the bevel gears to the vertical sensor shaft and to sensors installed outside the axial valve.

5. The axial valve according to claim 1, wherein one end of the steel wire rope is fixed to the piston rod and the other one in sensors installed outside the axial valve, wherein a yaw of the steel wire rope is performed by a tackle which rotates the steel wire rope for 90°, the tackle is fixed by a tackle flange located at an actuator bottom, wherein tracking of movement of the regulating piston is realized by means of the steel wire rope and a spring installed outside the axial valve that always holds the steel wire rope with the required tensile force, where the movement of sensors vertically from the outer valve body, when opening the valve, is achieved with the movement of the spring, and the vertical movement of sensors towards the outer valve body is achieved with the pull of the steel wire rope upon axial movement of the actuator piston rod in an axial valve closing direction.

6. The axial valve according to claim 5, wherein the steel wire rope extends in the vertical direction from the tackle within the bore extending along the central valve body and the outer valve body up to sensors installed outside the axial valve.

7. The axial valve according to claim 1, wherein a fixed horizontal screw spindle is coupled to a screw nut being connected to the actuator piston, a horizontal bevel gear spindle on which a first bevel gear is fixed and a vertical spindle on which a second bevel gear is attached, wherein the fixed horizontal bevel gear spindle and the vertical spindle are connected by the bevel gears, where actuation of the actuator takes place by turning the vertical spindle by means of an electric motor, hydraulic motor, pneumatic motor or a handwheel.

8. The axial valve according to claim 7, wherein the drive is a mechanical drive.

9. The axial valve according to claim 1, wherein the drive is a mechanical drive, pneumatic drive, pneumo-hydraulic drive or hydraulic drive.

10. The axial valve according to claim 1, wherein the sealing system providing protection from the ingress of an outer flow fluid towards the interior of the actuator comprises an actuator piston rod sealing system, sealing of the regulating piston and gaskets located at a rear outlet of the axial valve.

11. The axial valve according to claim 1, wherein the sealing control of the actuator and of the actuator piston rod is realized by means of a groove located in a piston rod guide and a bore through which a leakage fluid passes to a radially positioned pipe, where presence of the flow fluid or a pressure increase in the pipe at a connection means that a piston rod gasket located between the piston rod guide and the actuator piston rod is damaged and leaking, and presence of the control fluid or the pressure increase in the pipe at the connection means that an inner gasket of the piston rod located on a rim of the actuator piston rod between the central valve body and resting on the other end of the piston rod guide is damaged and leaking.

12. The axial valve according to claim 11, wherein the sealing control of the actuator or actuator piston rod is realized by a visual check for presence of the leakage fluid in the pipe or at the connection, or remotely by a pressure switch or probe by controlling a pressure increase of the leakage fluid in the pipe.

13. The axial valve according to claim 1, wherein the single-part outer valve body is used for the hydraulic or the mechanical actuator, and the two-part outer valve body is used for the pneumo-hydraulic or the pneumatic actuator.

* * * * *